(12) United States Patent
Ung et al.

(10) Patent No.: US 7,274,356 B2
(45) Date of Patent: Sep. 25, 2007

(54) APPARATUS FOR DETERMINING THE LOCATION OF A POINTER WITHIN A REGION OF INTEREST

(75) Inventors: Chi Man Charles Ung, Calgary (CA); David Kenneth Booth, Tigard, OR (US); Stephen Worthington, Calgary (CA); Mark Andrew Fletcher, Calgary (CA); Roberto A. L. Sirotich, Calgary (CA)

(73) Assignee: Smart Technologies Inc. (CA)

( * ) Notice: Subject to any disclaimer, the term of this patent is extended or adjusted under 35 U.S.C. 154(b) by 532 days.

(21) Appl. No.: 10/681,330

(22) Filed: Oct. 9, 2003

(65) Prior Publication Data
US 2005/0078095 A1    Apr. 14, 2005

(51) Int. Cl.
*G06F 3/042*    (2006.01)
*G06F 3/041*    (2006.01)
*G06F 3/033*    (2006.01)
*G09G 5/08*    (2006.01)

(52) U.S. Cl. .................. 345/158; 178/18.09; 345/173; 345/175

(58) Field of Classification Search ........ 345/173–179, 345/158; 178/18.01–18.11, 19.01–19.06
See application file for complete search history.

(56) References Cited

U.S. PATENT DOCUMENTS

| | | | |
|---|---|---|---|
| 4,107,522 A * | 8/1978 | Walter | ........................ 250/221 |
| 4,558,313 A | 12/1985 | Garwin et al. | |
| 4,762,990 A | 8/1988 | Caswell et al. | |
| 4,820,050 A | 4/1989 | Griffin | |
| 4,980,547 A | 12/1990 | Griffin | |
| 5,196,835 A | 3/1993 | Blue et al. | |
| 5,484,966 A * | 1/1996 | Segen | ..................... 178/18.09 |
| 5,502,568 A | 3/1996 | Ogawa et al. | |
| 5,734,375 A * | 3/1998 | Knox et al. | ................... 345/168 |
| 5,764,223 A * | 6/1998 | Chang et al. | ................ 345/175 |
| 6,100,538 A * | 8/2000 | Ogawa | ................... 250/559.29 |
| 6,421,042 B1 * | 7/2002 | Omura et al. | ................ 345/157 |
| 2001/0022579 A1 * | 9/2001 | Hirabayashi | ................ 345/175 |

FOREIGN PATENT DOCUMENTS

| | | |
|---|---|---|
| EP | 0 657 841 A1 | 6/1995 |
| GB | 2 204 126 A | 11/1988 |
| WO | WO 02/03316 A1 | 1/2002 |

* cited by examiner

*Primary Examiner*—Sumati Lefkowitz
*Assistant Examiner*—Alexander S. Beck
(74) *Attorney, Agent, or Firm*—Katten Muchin Rosenman LLP

(57) ABSTRACT

An apparatus for detecting a pointer within a region of interest includes a first reflective element extending along a first side of the region of interest and reflecting light towards the region of interest. A second reflective element extends along a second side of the region of interest and reflects light towards the region of interest. The second side is joined to the first side to define a first corner. A non-reflective region generally in the plane of at least one of the first and second reflective elements is adjacent the first corner. At least one imaging device captures images of the region of interest including reflections from the first and second reflective elements.

89 Claims, 17 Drawing Sheets

APPARATUS FOR DETERMINING THE LOCATION OF A POINTER WITHIN A REGION OF INTEREST

FIELD OF THE INVENTION

The present invention relates generally to input systems and in particular to an apparatus for determining the location of a pointer within a region of interest.

BACKGROUND OF THE INVENTION

Touch systems are well known in the art and typically include a touch screen having a touch surface on which contacts are made using a pointer in order to generate user input. Pointer contacts with the touch surface are detected and are used to generate corresponding output depending on areas of the contact surface where the contacts are made. There are basically two general types of touch systems available and they can be broadly classified as "active" touch systems and "passive" touch systems.

Active touch systems allow a user to generate user input by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate user input by contacting the touch surface with a passive pointer and do not require the use of a special pointer in order to activate the touch surface. A passive pointer can be a finger, a cylinder of some material, or any suitable object that can be used to contact some predetermined area of interest on the touch surface.

Passive touch systems provide advantages over active touch systems in that any suitable pointing device, including a user's finger, can be used as a pointer to contact the touch surface. As a result, user input can easily be generated. Also, since special active pointers are not necessary in passive touch systems, battery power levels and/or pointer damage, theft, or misplacement are of no concern to users.

International PCT Application No. PCT/CA01/00980 filed on Jul. 5, 2001 and published under No. WO 02/03316 on Jan. 10, 2002, assigned to SMART Technologies Inc., assignee of the present invention, discloses a camera-based touch system comprising a touch screen that includes a passive touch surface on which a computer-generated image is presented. A rectangular bezel or frame surrounds the touch surface and supports digital cameras at its corners. The digital cameras have overlapping fields of view that encompass and look across the touch surface. The digital cameras acquire images looking across the touch surface from different locations and generate image data. Image data acquired by the digital cameras is processed by digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer relative to the touch surface using triangulation. The pointer location data is conveyed to a computer executing one or more application programs. The computer uses the pointer location data to update the computer-generated image that is presented on the touch surface. Pointer contacts on the touch surface can therefore be recorded as writing or drawing or used to control execution of applications programs executed by the computer.

Although the above touch system works extremely well, the use of four digital cameras and associated digital signal processors to process image data captured by the digital cameras makes the touch system hardware intensive and therefore, increases the costs of manufacture. This of course translates into higher costs to consumers. In some environments where expense is of a primary concern, less expensive touch systems are desired.

A camera-based touch system having reduced hardware has been considered. For example, U.S. Pat. No. 5,484,966 to Segen discloses an apparatus for determining the location of an object within a generally rectangular active area. The apparatus includes a pair of mirrors extending along different sides of the active area and oriented so that the planes of the mirrors are substantially perpendicular to the plane of the active area. The mirrors are arranged at a 90 degree angle with respect to one another and intersect at a corner of the active area that is diametrically opposite a detecting device. The detecting device includes a mirror and a CCD sensor and looks along the plane of the active area. A processor communicates with the detecting device and receives image data from the CCD sensor.

When a stylus is placed in the active area, the detecting device sees the stylus directly as well as images of the stylus reflected by the mirrors. Images including the stylus and stylus reflections are captured by the detecting device and the captured images are processed by the processor to detect the stylus and stylus reflections in the captured images. With the stylus and stylus reflections determined, the location of the stylus within the active area is calculated using triangulation.

Although this apparatus reduces hardware requirements since only one optical sensing device and processor are used, problems exist in that at certain locations within the active area, namely along the side edges and the corner diametrically opposite the detecting device, resolution is reduced. As will be appreciated, a touch system that takes advantage of reduced hardware requirements yet maintains high resolution is desired.

It is therefore an object of the present invention to provide a novel apparatus for determining the location of a pointer within a region of interest.

SUMMARY OF THE INVENTION

According to one aspect of the present invention there is provided an apparatus for detecting a pointer within a region of interest comprising:

a first reflective element extending along a first side of said region of interest and reflecting light towards said region of interest;

a second reflective element extending along a second side of said region of interest and reflecting light towards said region of interest, said second side being joined to said first side to define a first corner;

a non-reflective region generally in the plane of at least one of said first and second reflective elements adjacent said first corner; and at least one imaging device capturing images of said region of interest including reflections from said first and second reflective elements.

In a preferred embodiment, the non-reflective region extends in the planes of both of the first and second reflective elements. The first and second reflective elements may extend only partially along the first and second sides to define a gap at the first corner or may extend fully along the first and second sides and be rendered non-reflective at the first corner.

It is also preferred that the first and second reflective elements extend along sides of a generally rectangular touch surface. In this case, the region of interest includes an active area delineated by a margin extending about the periphery of the touch surface. The margin is sized to inhibit merging of a pointer with one or more pointer reflections in a captured image.

In a preferred embodiment, the apparatus includes a single imaging device looking across the region of interest from a second corner diagonally opposite the first corner. Preferably, the imaging device includes an image sensor with an active pixel sub-array. The first and second reflective elements in this case are configured to aim reflective light towards the pixel sub-array.

According to another aspect of the present invention there is provided an apparatus for detecting a pointer within a region of interest comprising:
  a generally rectangular touch surface having an active sub-area defining said region of interest;
  a first reflective element extending along a first side of said touch surface and reflecting light towards said region of interest;
  a second reflective element extending along a second side of said touch surface and reflecting light towards said region of interest, said second side being joined to said first side at a first corner of said touch surface; and
  a detecting device detecting a pointer within said region of interest and reflections of said pointer appearing in said first and second reflective elements and determining the location of said pointer within said region of interest, said active sub-area being sized to inhibit said detecting device from detecting a pointer within said region of interest that merges with one or more of said reflections to an extent that the location of said pointer cannot be resolved.

According to yet another aspect of the present invention there is provided an apparatus for detecting a pointer within a region of interest comprising:
  a first reflective element extending along a first side of said region of interest and reflecting light towards said region of interest;
  a second reflective element extending along a second side of said region of interest and reflecting light towards said region of interest, said second side being joined to said first side to define a first corner; and
  at least one imaging device capturing images of said region of interest and reflections from said first and second reflective elements, said at least one imaging device having an active pixel sub-array and said first and second reflective elements being configured to aim reflected light towards said active pixel sub-array.

According to still yet another aspect of the present invention there is provided an apparatus for detecting a pointer within a region of interest comprising:
  a generally rectangular touch surface having an active sub-area defining said region of interest;
  a detecting device looking across said sub-area from one corner of said touch surface; and
  a first reflective element extending along one side of said touch surface and reflecting light towards said region of interest and towards said detecting device, wherein when a pointer is positioned within said region of interest, said detecting device sees said pointer and a reflection of said pointer appearing in said first reflective element, said active sub-area being sized to inhibit said detecting device from seeing a pointer within said region of interest that merges with said reflection to an extent that said pointer and reflection cannot be resolved.

According to still yet another aspect of the present invention there is provided an apparatus for detecting a pointer within a region of interest comprising:
  a first reflective element extending along a first side of said region of interest and reflecting light towards said region of interest;
  non-reflective surfaces extending along the other sides of said region of interest; and
  at least one imaging device capturing images of said region of interest including reflections from said first reflective element, said at least one imaging device having an active pixel sub-array and said first reflective element being configured to aim reflected light towards said active pixel sub-array.

According to still yet another aspect of the present invention there is provided an apparatus for detecting a pointer within a generally rectangular region of interest comprising:
  a detecting device looking across said region of interest from one corner thereof;
  a first reflective element extending along one side of said region of interest that is within the field of view of said detecting device and reflecting light towards said region of interest;
  non-reflecting surfaces extending along the remaining sides of said region of interest; and
  at least one illumination source for providing backlight illumination across said region of interest, wherein when a pointer is positioned within said region of interest, said detecting device sees said pointer directly and a reflection of said pointer in said first reflective surface.

The present invention provides advantages in that the non-reflective region provided near the corner of the region of interest inhibits the imaging device from seeing the true pointer merging with its double reflection. Also, providing the margin about the periphery of the region of interest inhibits the imaging device from seeing the true pointer merge with one or more other pointer reflections. By controlling merging so that the true pointer will not merge with pointer reflections, resolution of the apparatus is maintained.

The present invention provides further advantages in that since the mirrors are configured to aim reflected towards the active pixel sub-array of the imaging device, pointers appearing in the field of view of the imaging device can be detected and their positions relative to the touch surface calculated accurately.

BRIEF DESCRIPTION OF THE DRAWINGS

Embodiments of the present invention will now be described more fully with reference to the accompanying drawings in which:

FIG. 22b is a top plan view of the illuminated bezel of FIG. 22a.

DETAILED DESCRIPTION OF THE PREFERRED EMBODIMENTS

Figure 1:
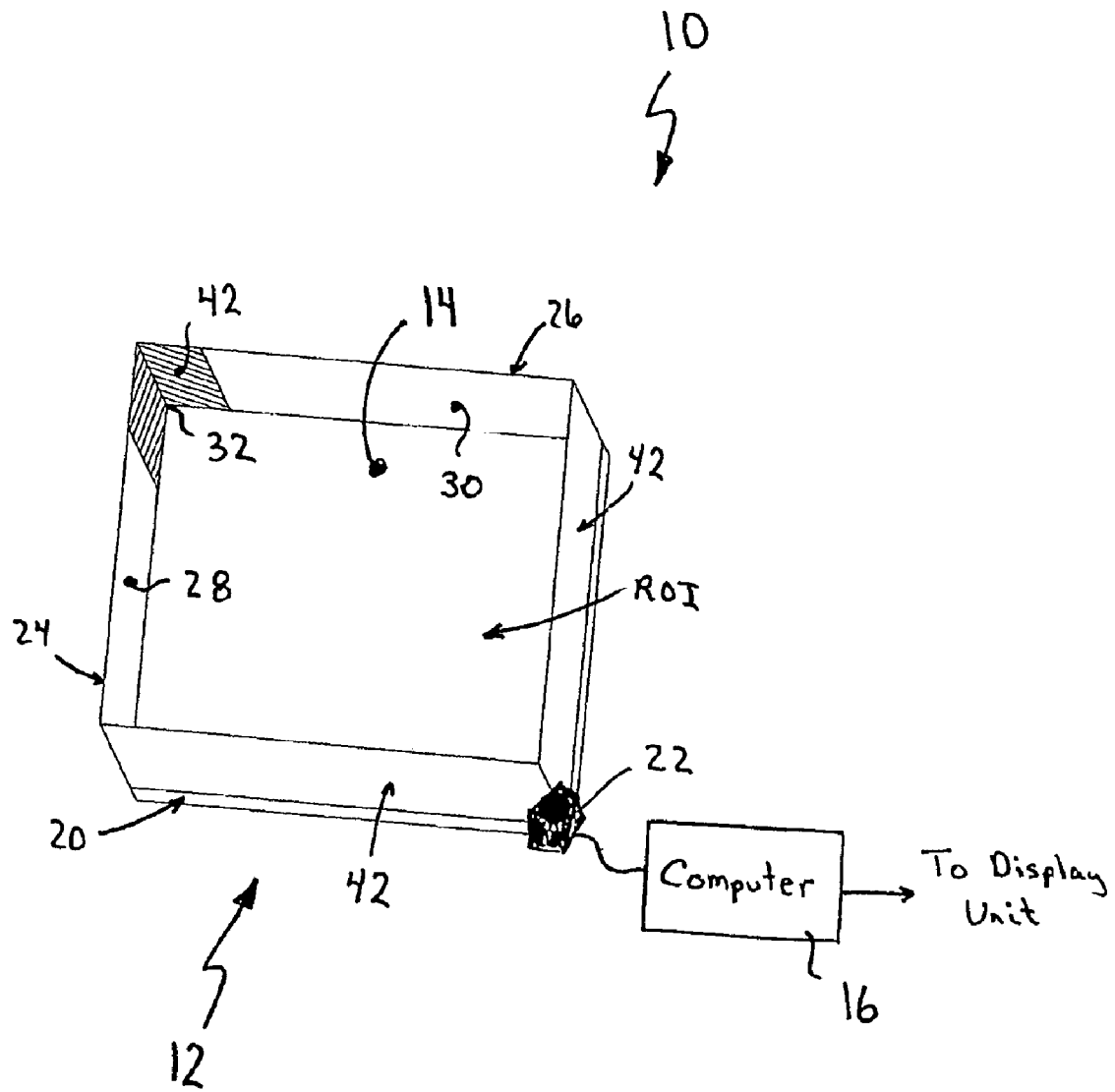
FIG. 1 is a schematic view of an apparatus for determining the location of a pointer within a region of interest in accordance with the present invention.
Figure 2:
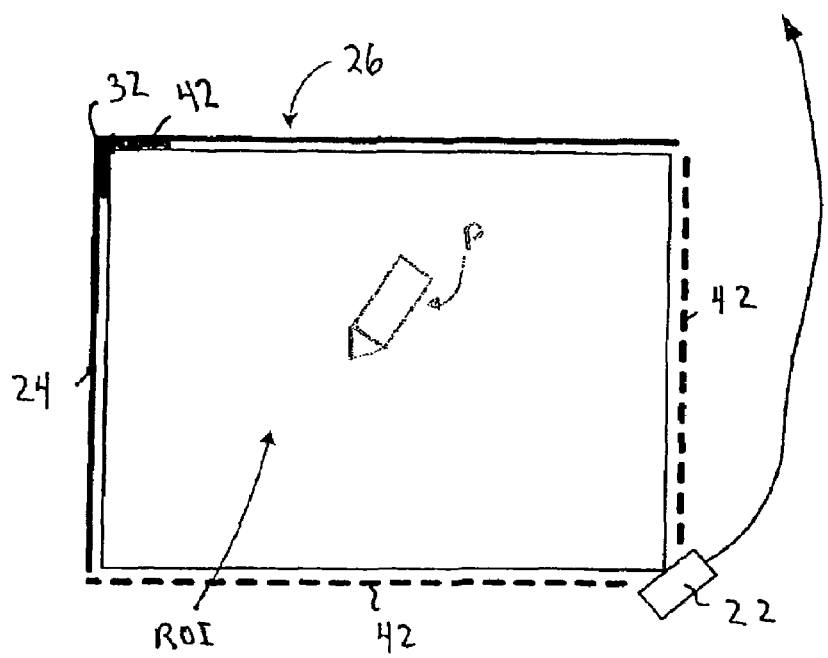
FIG. 2 is a plan view of an assembly forming part of the apparatus of FIG. 1.
Figure 3:
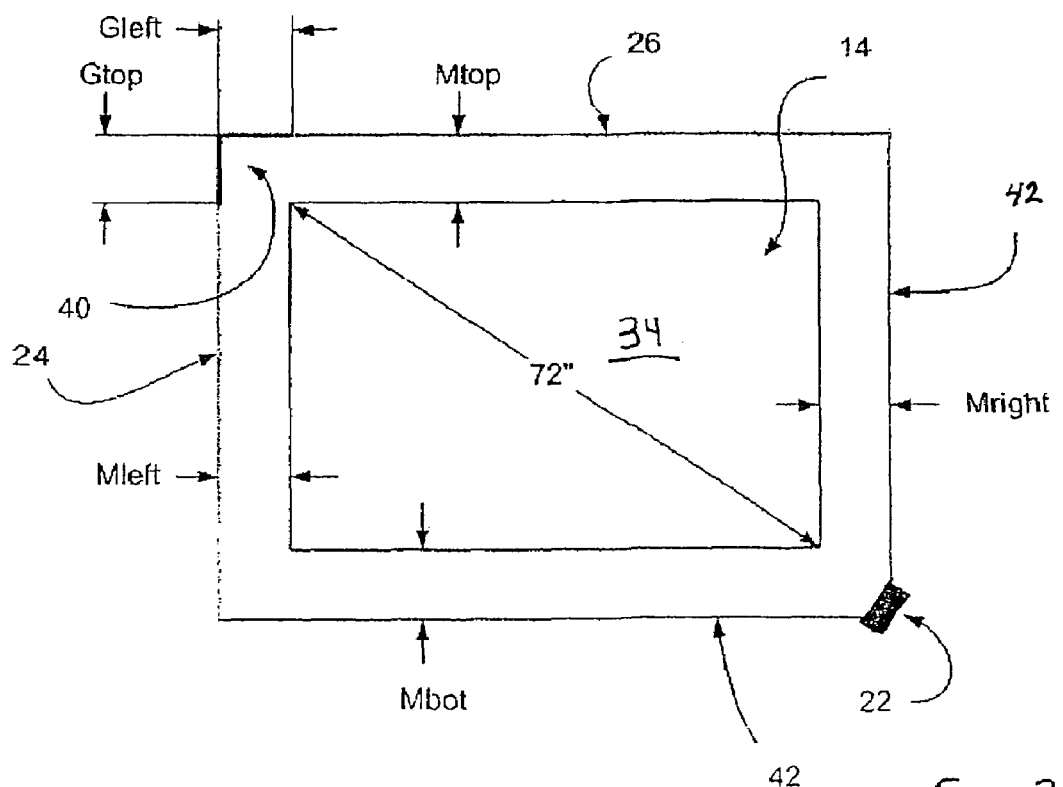
FIG. 3 is another plan view of the assembly of FIG. 2 showing the region of interest encompassed by the assembly including an active area bounded by margins.

Turning now to FIGS. 1 to 3, an apparatus for determining the location of a pointer within a region of interest in accordance with the present invention is shown and is generally identified by reference numeral 10. In this particular embodiment, apparatus 10 is in the form of a touch system and is disposed over the display screen of a display unit such as a plasma television, front or rear projection screen or the like (not shown). As can be seen, apparatus 10 includes a generally rectangular assembly 12 encompassing a region of interest ROI and surrounding a transparent touch surface 14 that overlies the display screen. Assembly 12 communicates with a computer 16 executing one or more application programs. The computer 16 uses pointer data generated by the assembly 12 to update computer-generated images that are presented on the display screen. Pointer contacts on the touch surface 14 can therefore be recorded as writing or drawing or used to control execution of application programs executed by the computer 16.

Assembly 12 includes a frame 20 supporting an imaging device 22 adjacent one corner of the touch surface 14. The imaging device 22 has a field of view that looks generally across the plane of the touch surface 14 and is oriented so that its optical axis generally forms a 45 degree angle with adjacent sides of the touch surface 14. A pair of mirrors 24 and 26 is also supported by the frame 20. Each mirror 24, 26 extends along a different side of the touch surface and is oriented so that the plane of its reflecting surface 28, 30 is generally perpendicular to the plane of the touch surface 14. The mirrors 24 and 26 are thus arranged at generally a 90 degree angle with respect to one another and intersect at a corner 32 of the touch surface 14 that is diagonally opposite the imaging device 22. A gap 40 is provided between the two mirrors 24 and 26 at the corner 32 to define a non-reflecting area or region.

The frame 20 also supports infrared illuminated bezels 42 extending along the remaining two sides of the touch surface 14. The infrared illuminated bezels 42 direct light towards the reflecting surfaces of the mirrors 24 and 26 to provide bands of infrared backlighting for the imaging device 22. A band of infrared illumination directed towards the imaging device 22 is also provided by an illuminated bezel 42 disposed within the gap 40. The imaging device 22 therefore observes a generally continuous band of infrared illumination when no pointer is located within the region of interest. However, when the imaging device 22 acquires an image and a pointer P is located within the region of interest, the pointer P occludes light and appears to the imaging device 22 as a black or dark object against a white background. The infrared illuminated bezels 42 are the same as those described in U.S. patent application Ser. No. 10/354,168 entitled "Illuminated Bezel And Touch System Incorporating The Same" to Akitt et al. filed on Jan. 30, 2003 and assigned to SMART Technologies Inc, assignee of the present invention, the content of which is incorporated herein by reference. Accordingly, specifics of the infrared illuminated bezels 42 will not be described further herein.

The region of interest ROI is bounded by bottom, top, left and right margins $M_{bot}$, $M_{top}$, $M_{left}$, $M_{right}$ respectively to define an active area 34. The height of the region of interest is determined by the geometry of the mirrors 24 and 26, the illuminated bezels 42 and the field of view of the imaging device 22. In the present embodiment, each of the margins has a one-inch width giving the active area 34 a diagonal dimension equal to 72 inches. The size of the gap 40 is a function of the size of the touch surface 14, the widths of the margins and the size of the pointer used to contact the touch surface 14. Further specifics concerning the manner by which the gap and margin sizes are calculated will be described herein.

Figure 4:
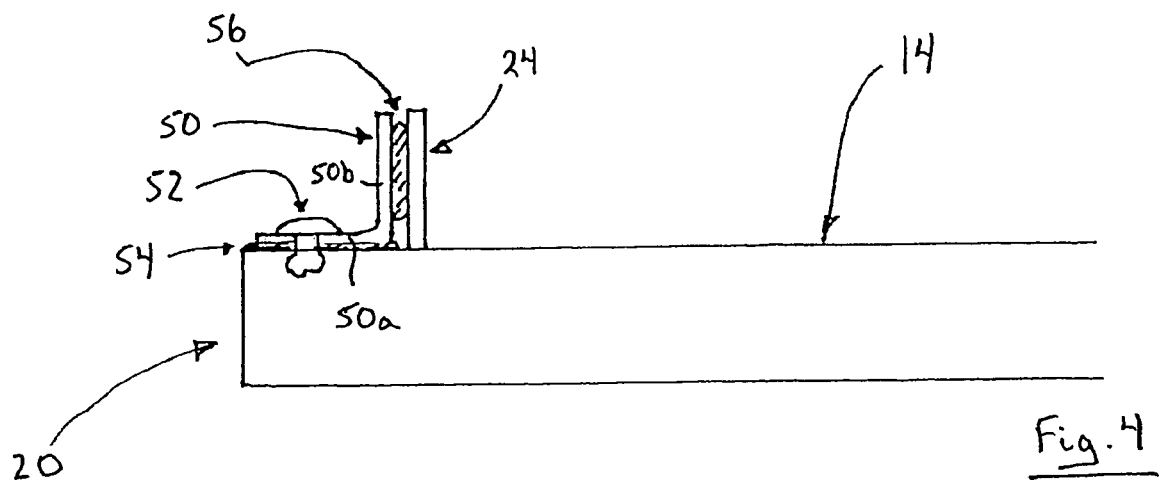
FIG. 4 is a side view, partly in section, of a portion of the assembly of FIG. 2, showing a mirror assembly.

Each mirror 24, 26 is supported on the frame 20 by a right angle extruded bracket 50 as shown in FIG. 4. Each bracket 50 is secured to the frame 20 by fasteners 52 in the form of blind rivets that pass through the leg 50a of the bracket 50 that overlies the frame 20. Adhesive 54 is placed between the leg 50a and the frame 20 to secure further the bracket 50 to the frame and inhibit the bracket from moving relative to the frame even if the rivets 52 loosen. The adhesive 54 also acts as a filler. The mirror is secured to other leg 50b of the bracket 50 by adhesive 56 to inhibit relative movement between the bracket 50 and the mirror. In the preferred embodiment, GE Silicone SE1124 All Purpose Silicone Seal is used as the adhesive.

The reflective surfaces 28 and 30 of the mirrors 24 and 26 are generally planar and are oriented so that the bands of backlight illumination provided by the illuminated bezels 42, when reflected by the mirrors, are directed towards an active pixel sub-array of the imaging device 22. Orienting the mirrors 24 and 26 so that the reflective surfaces achieve this desired function maintains the resolution of the apparatus 10 allowing pointer hover and pointer contact with the touch surface 14 to be accurately determined. To align the mirrors, during assembly, adhesive 56 is placed along the leg 50b of each bracket 50 and the mirrors are set in place. While the adhesive 56 is setting, the tilt of each mirror is adjusted until the backlighting reflected by the reflective surface is directed toward the active pixel sub-array of the imaging device 22. Once the adhesive 56 sets, the mirrors 24 and 26 are securely held by the adhesive 56 thereby to maintain their orientation.

Figure 5:
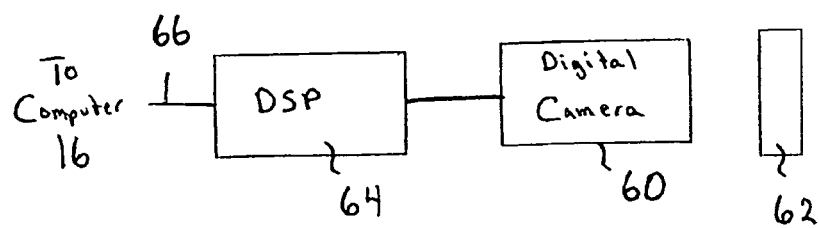
FIG. 5 is a schematic block diagram of an imaging device forming part of the apparatus of FIG. 1.

The imaging device 22 is best seen in FIG. 5 and includes a high resolution 1280×1024 CMOS digital camera 60 such as that manufactured by National Semiconductor under model No. LM9638 and an associated lens 62. A digital signal processor (DSP) 64 is coupled to the digital camera 60. The digital camera 60 and DSP 64 are mounted on a common circuit board. The circuit board is positioned with respect to the touch surface 14 so that the digital camera 60 looks out across the plane of the touch surface 14. The lens 62 has a 98 degree field of view so that the entire active area 34 is within the field of view of the digital camera 60 plus 4 degrees of tolerance on either side of the region of interest. The DSP 64 is also coupled to the computer 16 via a universal serial bus (USB) or RS232 serial cable 66. The digital camera 60 preferably is configured to have a 1280×40 active pixel sub-array allowing it to be operated to capture image frames at high frame rates (i.e. in excess of 200 frames per second).

Figure 6:
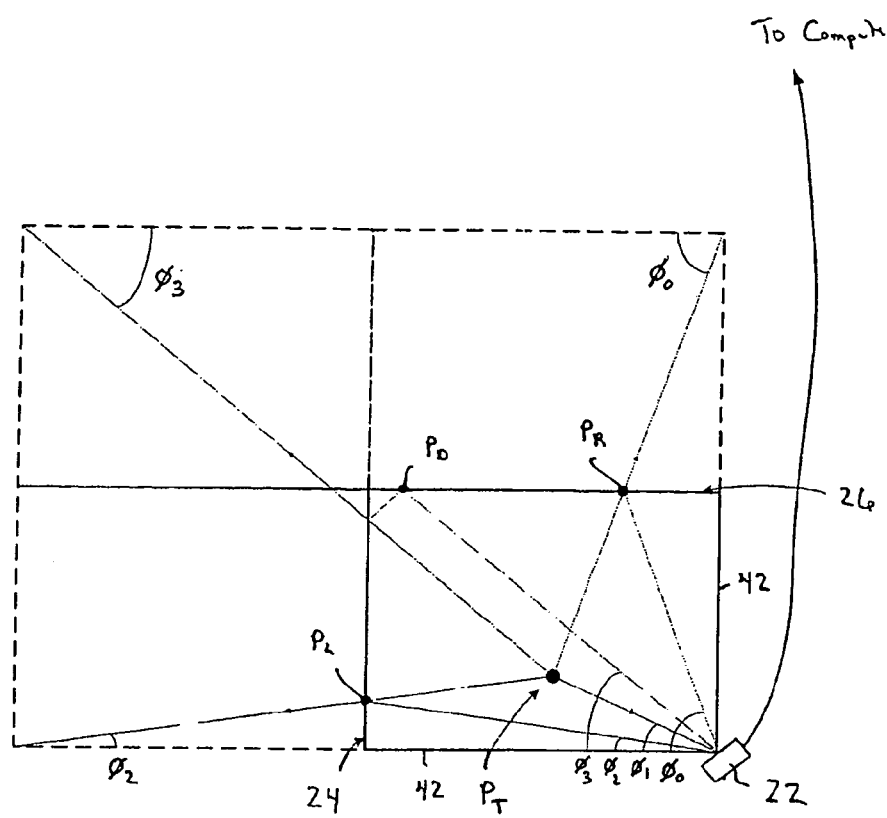
FIG. 6 is a plan view showing a pointer within the region of interest and resulting pointer reflections.
Figure 7:
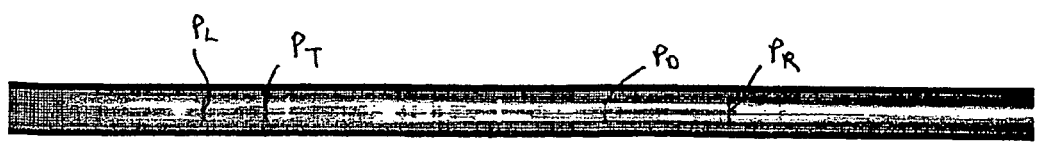
FIG. 7 is an image captured by the imaging device of FIG. 5.

During use, when a pointer P is brought into the active area 34 of the region of interest ROI and therefore, into the field of view of the digital camera 60, the pointer P occludes the backlight illumination emitted by the illuminated bezel 42 in the gap 40 and the backlight illumination reflected by the mirrors 24 and 26. When the digital camera 60 captures an image and a pointer P is in the image, depending on the position of the pointer P, the captured image includes dark areas representing the pointer P and images or reflections of the pointer. Depending on the location of the pointer relative to the active area 34 different scenarios may occur. For example, the captured image may include dark areas representing the true pointer $P_T$, and three images of the pointer resulting from right, left and double pointer reflections $P_R$, $P_L$, $P_D$ respectively or may include dark areas representing the true pointer $P_T$, and two pointer images. FIG. 6 shows the true pointer $P_T$ and the pointer reflections $P_R$, $P_L$, $P_D$ as seen by the digital camera 60 as a result of occluded backlighting and the angles $\emptyset_0$ to $\emptyset_3$ associated with the true pointer $P_T$ and the pointer reflections $P_R$, $P_L$, $P_D$. FIG. 7 shows a captured image including the true pointer $P_T$ and the pointer reflections $P_R$, $P_L$ and $P_D$.

Although the touch system 10 includes only a single digital camera 60, the use of the mirrors 24 and 26 to reflect images of the pointer P towards the digital camera 60 effectively creates a touch system that is four times as large with virtual cameras at each of its corners as shown in FIG. 6. In this case, the pointer reflections can be considered to be seen by virtual cameras with the pointer reflections in the mirrors 24 and 26 determining the positions of the virtual cameras. Angles are associated with the virtual camera images and these angles are identical to the angles $\emptyset_0$ to $\emptyset_3$ associated with the true pointer and pointer reflections.

In order to determine the position of the pointer P relative to the touch surface 14, it is necessary to distinguish between the true pointer and the various pointer reflections in the captured image. Relying on the geometry of the touch system 10, the following relationships between the angles $\emptyset_1$ to $\emptyset_3$ hold true. $\emptyset_2$ is less than or equal to $\emptyset_1$, which is less than or equal to $\emptyset_0$. $\emptyset_2$ is less than or equal to $\emptyset_3$, which is less than or equal to $\emptyset_0$. As a result, the outer two pointers in the captured image always correspond to angles $\emptyset_2$ and $\emptyset_0$ and the two inner pointers in the captured image always correspond to angles $\emptyset_1$ and $\emptyset_3$.

When the captured image includes four dark areas representing the true pointer $P_T$, the right pointer reflection $P_R$, the left pointer reflection $P_L$ and the double pointer reflection $P_D$, distinguishing between the true pointer and the pointer reflections is a straightforward process. The dark area to the extreme left is the left pointer reflection $P_L$ and the dark area to the extreme right is the right pointer reflection $P_R$. To distinguish between the true pointer $P_T$ and the double pointer reflection $P_D$, i.e. the two intermediate dark areas, the column of the active pixel sub-array that contains the diagonal vertex, i.e. the midpoint of the illuminated bezel 42 within the gap 40, is determined. Once the column location of the diagonal vertex is determined, the columns of the active pixel sub-array that contain the two intermediate dark areas are determined. The distances between the columns that contain the two intermediate dark areas and the column containing the diagonal vertex are compared. Since the double pointer reflection $P_D$ is always further away from the imaging device 22, the column separation between the double pointer reflection $P_D$ and the diagonal vertex is always smaller than the column separation between the true pointer $P_T$ and the diagonal vertex. As a result by comparing the column separation between the intermediate dark areas and the diagonal vertex, the true pointer $P_T$ can be easily distinguished from the double pointer reflection $P_D$.

When the captured image includes three dark areas, the column location of the diagonal vertex is again determined and the number of dark areas on each side of the diagonal vertex area are determined. If two dark areas are to the left of the diagonal vertex and one dark area is to the right of the diagonal vertex, two scenarios are possible. In one scenario, the true pointer $P_T$ is merging with the right pointer reflection $P_R$. In this case, the left dark area is the left pointer reflection $P_L$ and the middle dark area is the double pointer reflection $P_D$. The right dark area includes both the true pointer $P_T$ and the right pointer reflection $P_R$. The other scenario is that the double pointer reflection $P_D$ is missing as a result of the non-reflective region associated with the gap 40. To determine which scenario exists, again the pointer data is processed for both scenarios and the scenario that yields a correctly triangulated location is determined to be correct. If both scenarios yield a correctly triangulated location, the position of the middle dark area relative to the diagonal vertex is determined. If the double pointer reflection $P_D$ is missing, the true pointer $P_T$ will be very close to the diagonal vertex.

Similarly if two dark areas are to the right of the diagonal vertex and one dark area is to the left of the diagonal vertex, two scenarios are possible. In one scenario, the true pointer $P_T$ is merging with the left pointer reflection $P_L$. In this case, the right dark area is the right pointer reflection $P_R$ and the middle dark area is the double pointer reflection $P_D$. The left dark area includes both the true pointer $P_T$ and the left pointer reflection $P_L$. The other scenario is that the double pointer reflection $P_D$ is missing as a result of the non-reflective region associated with the gap 40. To determine which scenario exists, again the pointer data is processed for both scenarios and the scenario that yields a correctly triangulated location is determined to be correct. If both scenarios yield a correctly triangulated location, the position of the middle dark area relative to the diagonal vertex is determined. If the double pointer reflection $P_D$ is missing, the true pointer $P_T$ will be very close to the diagonal vertex.

Knowing the true pointer $P_T$ and two or more of the pointer reflections $P_R$, $P_L$ and $P_D$ as well as the angles $\emptyset_0$ to $\emptyset_3$, the pointer position relative to the touch surface is calculated using triangulation as described in U.S. patent application Ser. No. 10/294,917 filed on Nov. 15, 2002 for an invention entitled "Size/Scale And Orientation Determination Of A Pointer In A Camera-Based Touch System" to Morrison et al, assigned to SMART Technologies Inc., assignee of the present invention, the content of which is incorporated herein by reference. Thus, a bounding area representing the pointer location relative to the touch surface 14 is determined and conveyed to the computer 16.

Figure 8A:
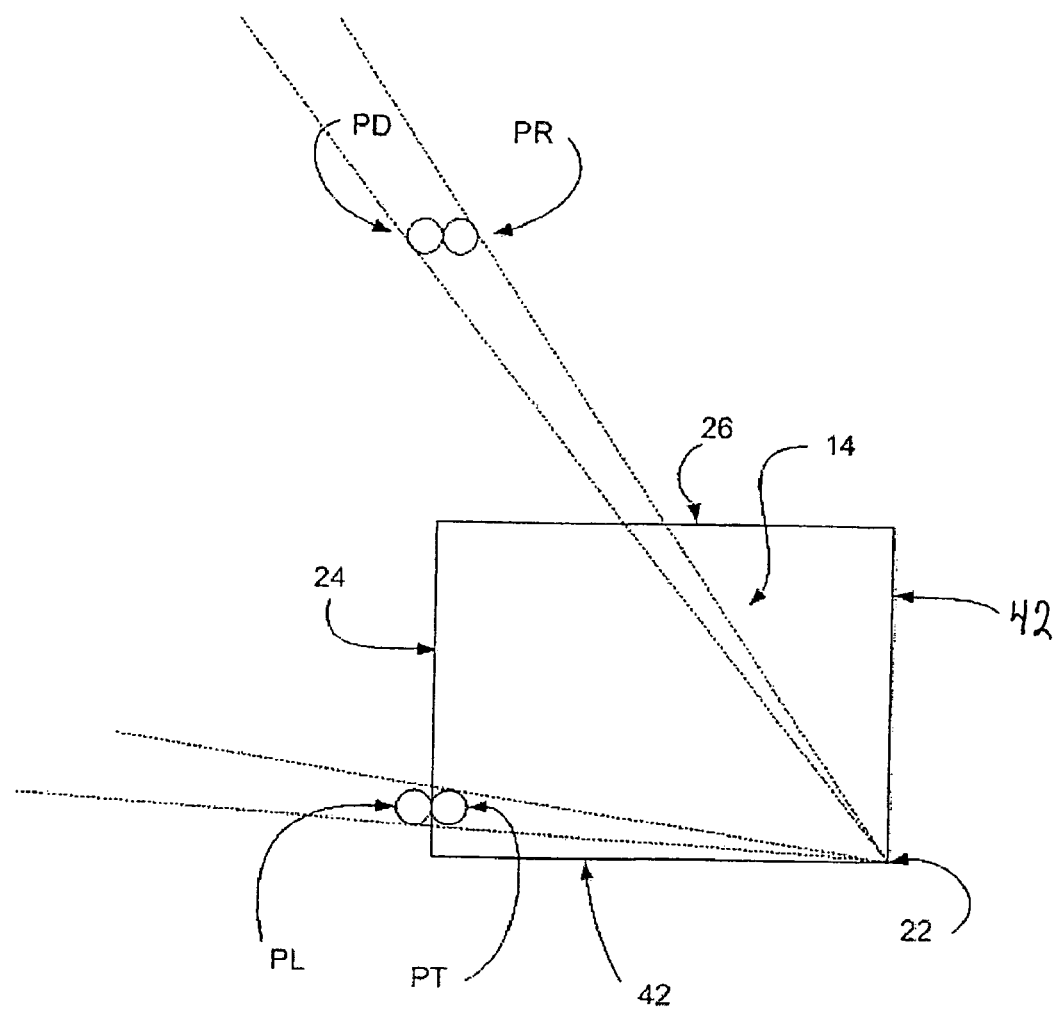
FIGS. 8a to 8d are plan views showing a pointer within the region of interest at locations resulting in pointer image merging.
Figure 8B:
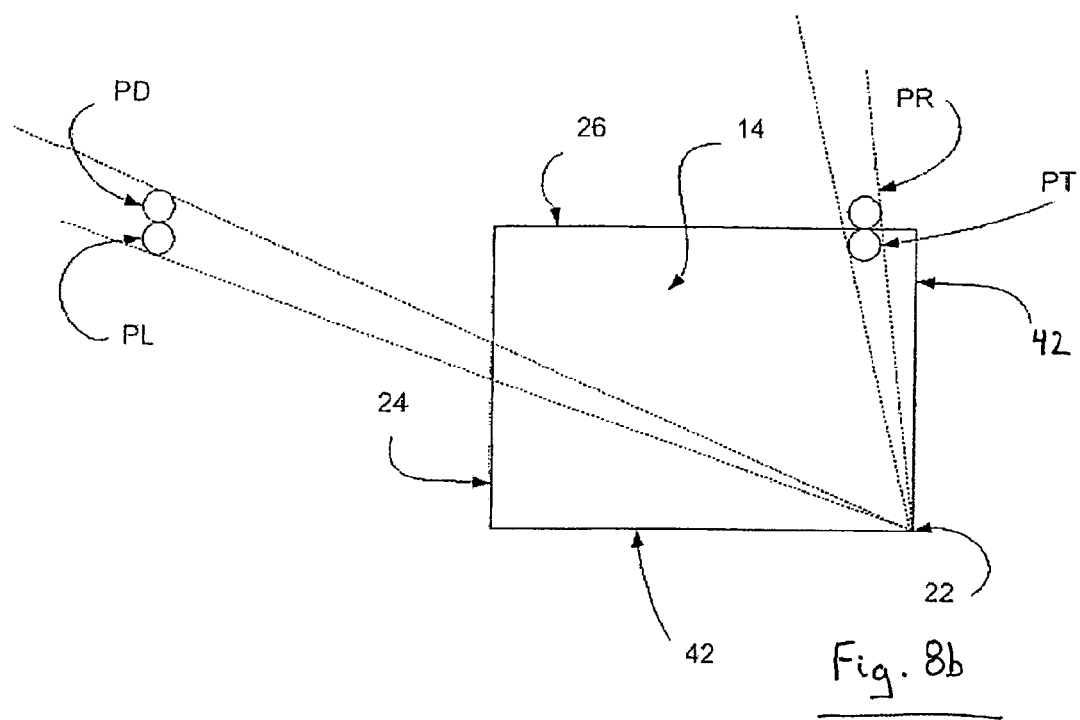
Figure 8C:
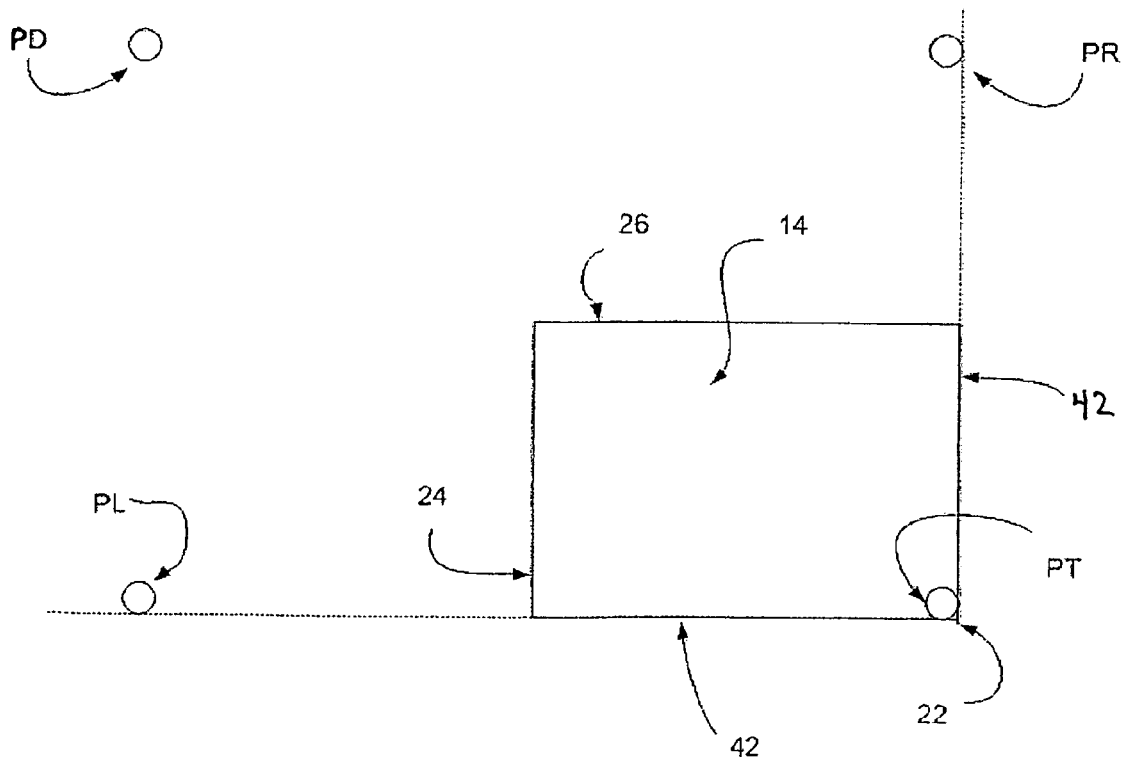
Figure 8D:
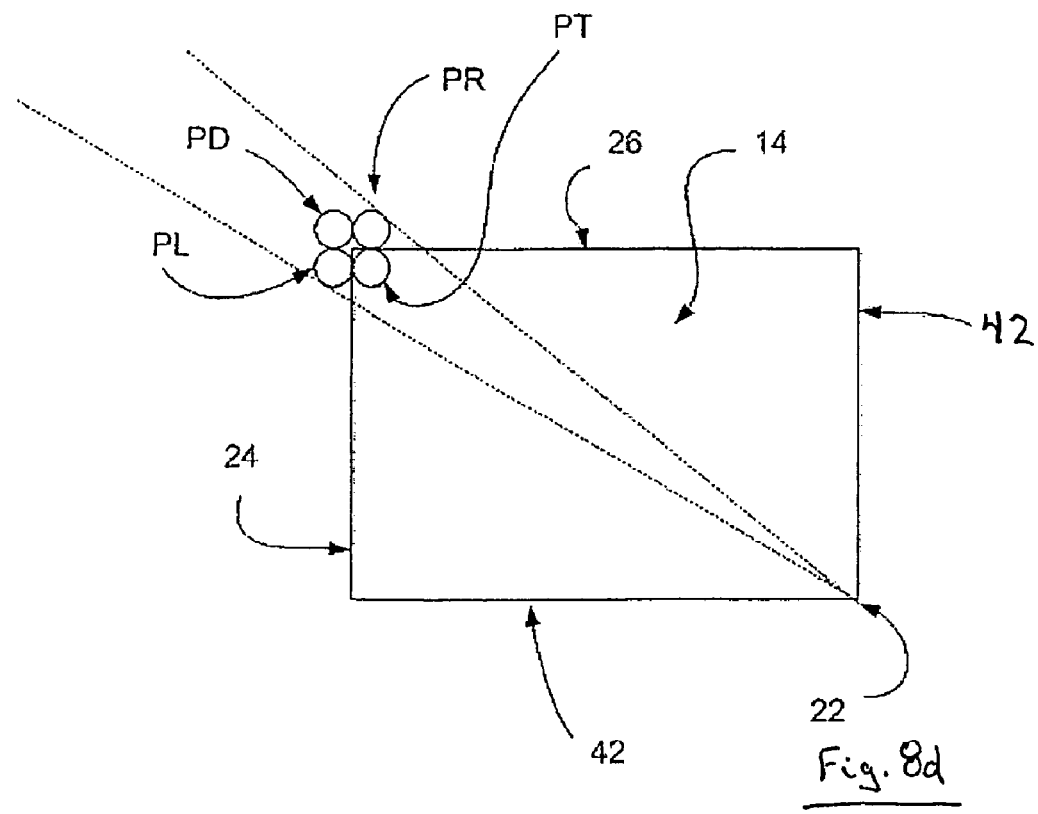

The margins are provided about the periphery of the active area 34 to avoid pointer identification ambiguity that may occur if the pointer P gets too close to the mirrors 24 and 26, too close to the imaging device 22 or too close to the diagonal vertex, i.e. corner 32. When the pointer P gets too close to the mirror 24 adjacent the illuminated bezel 42, the true pointer $P_T$ and left pointer reflection $P_L$ will merge and the right pointer reflection $P_R$ and double pointer reflection $P_D$ will merge as shown in FIG. 8a. When the pointer P gets too close to the mirror 26 adjacent the illuminated bezel 42, the true pointer $P_T$ and right pointer reflection $P_R$ will merge and the left pointer reflection $P_L$ and double pointer reflection $P_D$ will merge as shown in FIG. 8b. When the pointer P gets to close to the imaging device 22 or too close to the diagonal vertex, the true pointer $P_T$ and the left, right and double pointer reflections will merge as shown in FIGS. 8c and 8d. Assuming that the active area 34 has a diagonal dimension equal to 72 inches with a 4:3 aspect ratio where the pointer can go right to the extreme edges of the active area 34 and, assuming a maximum pointer diameter equal to ¾ inch, the dimensions of the margins are determined as follows.

Figure 9A:
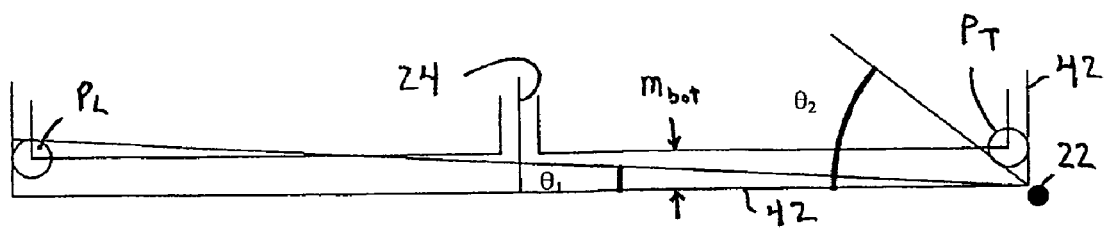
FIGS. 9a to 9d are illustrations showing determination of the margins within the region of interest.

The widths of the margins $M_{bot}$ and $M_{right}$ are determined by the situation where the pointer P gets too close to the imaging device 22 and are calculated as follows with reference to FIG. 9a.

When $\theta_2$ is less than $\theta_1$, the true pointer $P_T$ and the left pointer reflection $P_L$ will merge. Thus, in order to prevent merging, $\theta_2$ must be larger than $\theta_1$. To calculate margin $M_{bot}$, the smallest $M_{bot}$ is desired while ensuring $\theta_2$ is bigger than $\theta_1$.

The calculation of margin $M_{bot}$ depends on the values chosen for margins $M_{left}$ and $M_{right}$. In order to simplify the calculations, assume margins $M_{left}$ and $M_{right}$ both have widths equal to one inch. Using standard trigonometry, it can be deduced that:

$$\tan(\theta_1) \cong (M_{bot}+(\text{pointer diameter}/2))/(2 \times 4 \times 72/5 + M_{right}+2 \times M_{left})$$

$$\theta_1 \cong \arctan((M_{bot}+0.375)/118.2) < 1°$$

Substituting the measurements given above for the apparatus 10, it can be seen that $\theta_1 < 1°$. Similarly, it can be shown that:

$$\theta_2 \cong 90° - \arctan(M_{right}/M_{bot}) - \arcsin((\text{pointer diameter}/2)/\sqrt{(`M_{right})^2+(M_{bot})^2})$$

While it is possible to solve for margin $M_{bot}$ using analytic techniques, it is also possible to use a trial and error technique. The trial and error technique involves selecting a potential value for margin $M_{bot}$ and computing $\theta_2$ using the above equation. If $\theta_2$ is larger than $\theta_1$, then the selected margin $M_{bot}$ is acceptable and will inhibit pointer merging. By way of example, if margin $M_{bot}$ has a width equal to ½ inch and margin $M_{right}$ has a width equal to 1 inch, $\theta_2$ is 7°, which is larger than $\theta_1$.

Figure 9B:
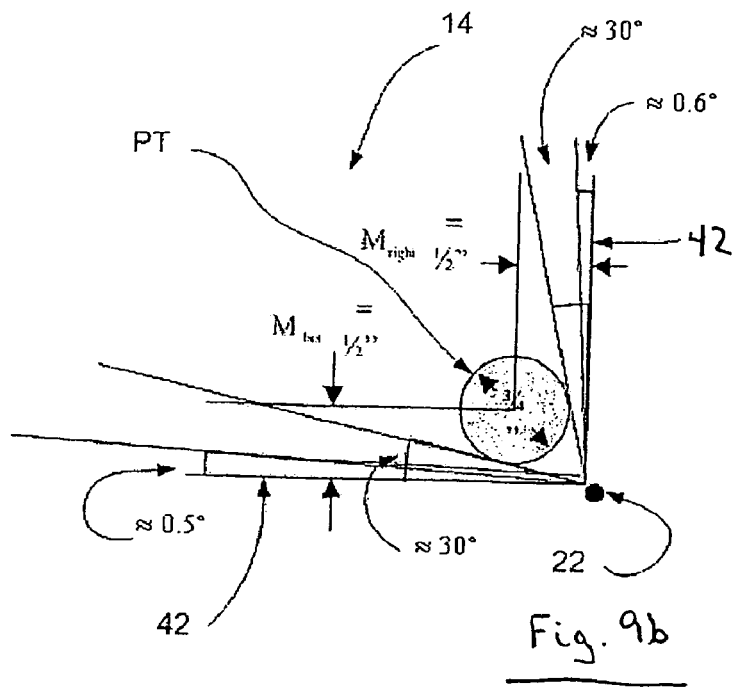

A similar technique can be applied to margin $M_{right}$ and a value can be computed for a given margin $M_{bot}$. Consider the example shown in FIG. 9b, with margin $M_{bot}$ and $M_{right}$ both having widths equal to ½ inch. In this case, $\theta_1$ for the bottom edge is 0.45 degrees and $\theta_1$ for the right edge is 0.6 degrees. $\theta_2$ for both cases works out to approximately 30 degrees, which clearly satisfies the condition that $\theta_2 > \theta_1$ along both edges.

Figure 9C:
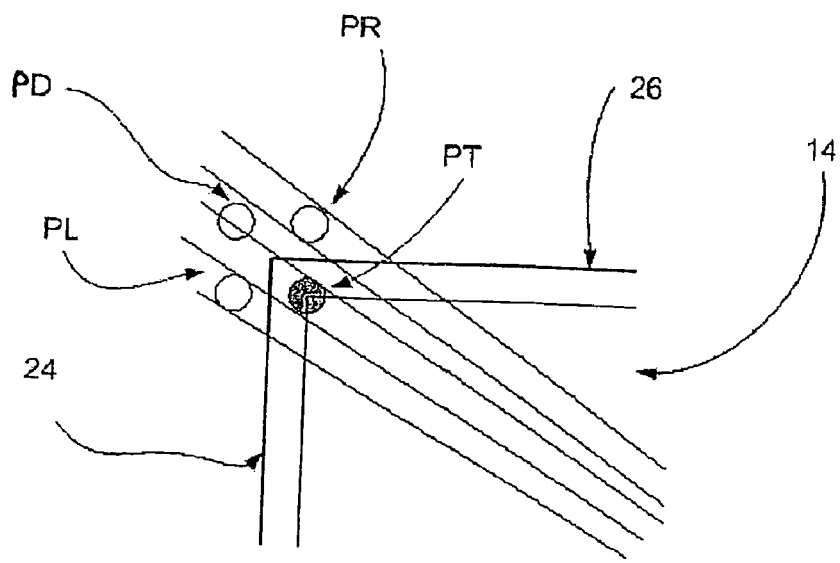

In order to inhibit pointer merging when the pointer P is too close to the mirrors near the illuminated bezels or too close to the diagonal vertex, a margin is introduced along the left and top sides of the active area 34. The worst case generally happens at the corner 32 diagonally opposite the imaging device 22 if the mirrors intersect at that corner. As will be appreciated, if the mirrors 24 and 26 extended along the entire lengths of the touch surface sides and intersected at the corner 32, when a pointer P is positioned near the corner 32, in a captured image the true pointer $P_T$ and the double pointer reflection $P_D$ will merge as shown in FIG. 9c. In this case, resolution decreases since the area of the bounding area representing the pointer location relative to the touch surface 14 increases. The gap 40 between the mirrors 24 and 26 at the corner 32 is provided to eliminate the double pointer reflection $P_D$ when the pointer P is near the corner 32. Specifically, for a given pointer size and a given touch surface size, the gap 40 is selected so that at no point on the touch surface will the true pointer $P_T$ merge with the double pointer reflection $P_D$.

Figure 9D:
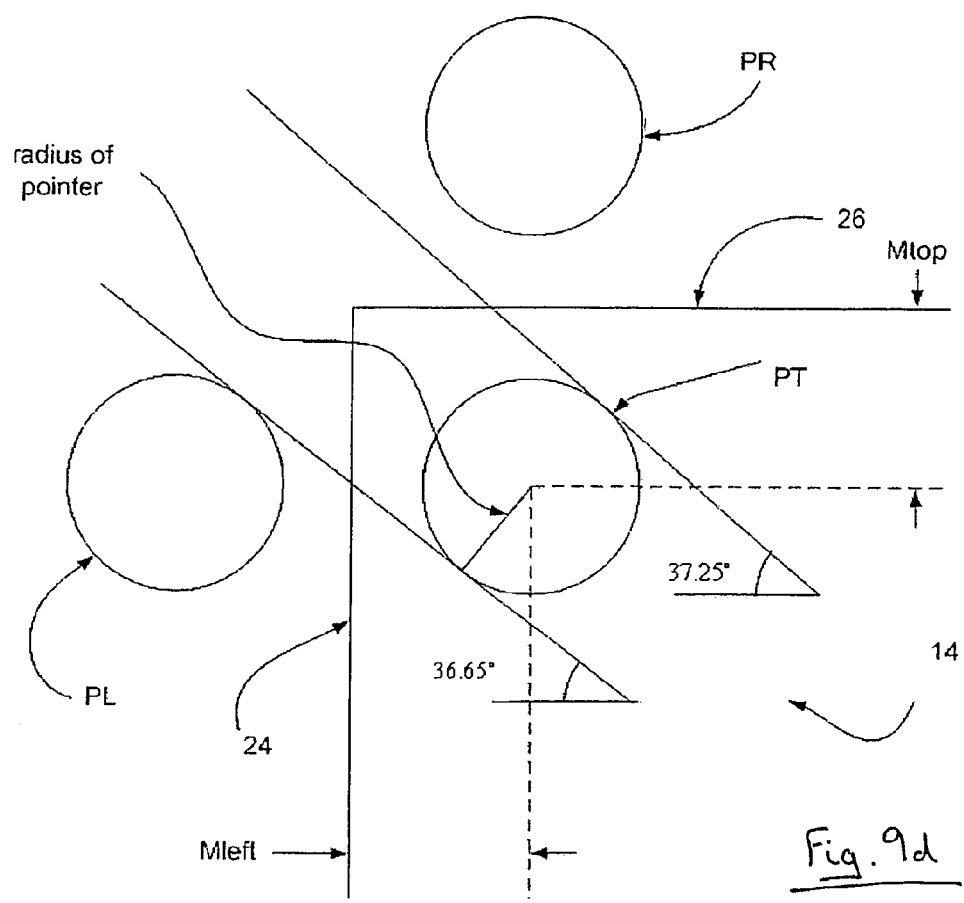

Using the same dimensions as above, the angles that bound the true pointer $P_T$ are 36.65° and 37.25° as shown in FIG. 9d. Using trigonometric techniques, it can be shown that:

$$M_{left} \geq \text{pointer radius}/\sin(36.65°) \geq 0.63"$$

$$M_{top} \geq \text{pointer radius}/\cos(37.25°) \geq 0.47"$$

In practice, the separation between the true pointer and a pointer reflection should be large enough such that the imaging device 22 can resolve the difference between the true pointer and the pointer reflection. Generally, the widths of the margins are selected to be greater than the minimum widths to take into account limitations in the resolving power of the imaging device 22 as well as the fact that the pointer P may be held at an angle relative to the touch surface.

When a pointer is positioned adjacent a corner of the touch surface 14 where one of the illuminated bezels 42 and mirrors meet, the true pointer and the pointer reflection from the nearest mirror merge. In this case, whenever a pointer image includes two pointer tips, the actual locations of the true pointer $P_T$ and the pointer reflection are ascertained using the shape of the bounding box surrounding the merged images.

The optical axis of the digital camera 60 is also at an oblique angle with respect to the plane of the touch surface 14 so that when a pointer P is in the active area 34 of the region of interest, the digital camera 60 sees the true pointer and the pointer reflections as well as reflections of the true pointer and the pointer reflections off of the touch surface 14. Pointer contacts with the touch surface 14 are determined when the true pointer and pointer reflections and their reflections off of the touch surface are in contact. Pointer hover is determined when the true pointer and pointer reflections and their reflections off of the touch surface 14 are spaced apart. Further specifics of this contact detect determination are described in U.S. patent application Ser. No. 10/384,796 filed on Mar. 11, 2003 for an invention entitled "Touch System And Method For Determining Pointer Contacts On A Touch Surface" to Morrison et al, assigned to SMART Technologies Inc., assignee of the present invention, the content of which is incorporated herein by reference.

Due to optical and mechanical limitations, in some instances even when a pointer is hovering over the touch surface 14, one or more of the true pointer and pointer reflections may appear to be in contact with their reflections off of the touch surface 14. To enhance contact detect, difference images are generated by subtracting current images of the true pointer and pointer reflections from the corresponding locations in a background image captured upon initialization of the apparatus. Then, a horizontal intensity profile (HIP) of the true pointer's and pointer reflection's difference image is combined with the captured binary image.

Figure 10:
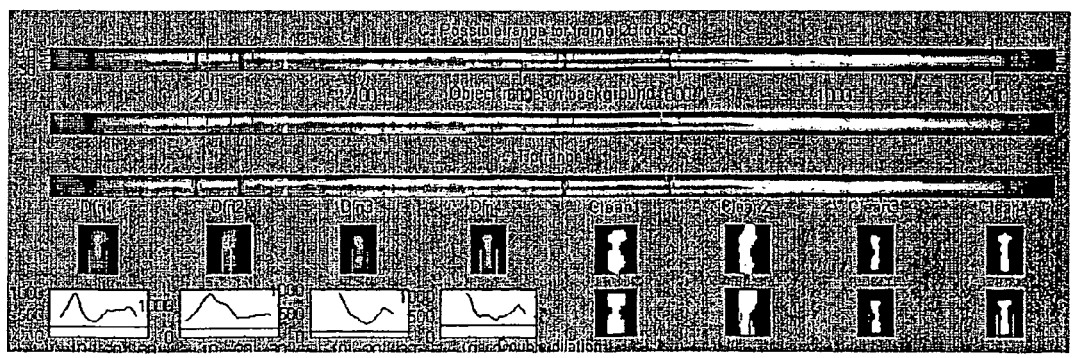
FIGS. 10 to 13 show captured images, local pointer difference images, horizontal intensity profiles (HIPs) and local pointer binary images.
Figure 11:
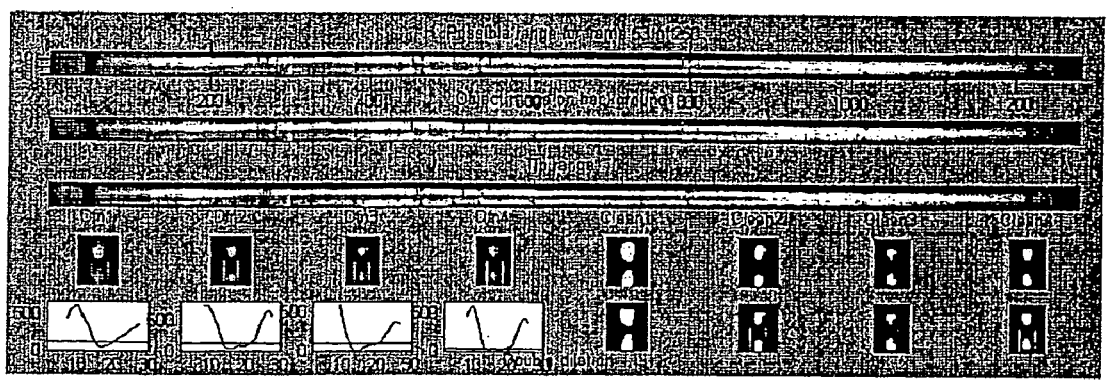

FIG. 10 shows a captured image including a true pointer and pointer reflections, four local difference images Dfn1 to Dfn4, the HIPs of the true pointer and pointer reflections together with associated threshold lines and processed binary images. The threshold line for the true pointer and pointer reflections is obtained by taking the average intensity value of the background plus two times the standard deviation. When a pointer P is in contact with the touch surface 14, each HIP should be above its threshold line and each binary image of the pointer should be solid as shown in FIG. 10. When a pointer P is hovering above the touch surface 14, each HIP should extend below its threshold line and each binary image of the pointer should show a gap as illustrated in FIG. 11.

Figure 12:
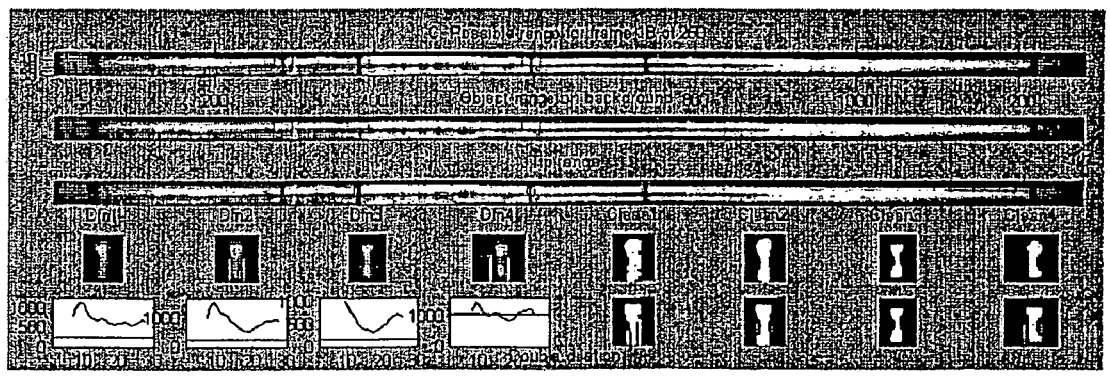

In some instances, an HIP and associated binary image may be inconsistent. For example, in FIG. 12, the HIP associated with the fourth pointer dark area extends below its threshold line yet the binary pointer image is solid. Situations where an HIP is above its threshold yet the associated binary pointer image shows a gap can also occur. As a result, determining contact using only HIPs or binary images can yield inaccuracies. Accordingly, when any of the following two conditions are met, the pointer P is determined to be hovering over the touch surface 14; otherwise it is determined to be in contact with the touch surface:

for at least two pointers, there is a gap of the pointer in the binary image; or for at least one pointer, the associated HIP extends below its threshold line and there is a gap of the pointer in the binary image and for at least two pointers their associated HIPs extend below their threshold lines.

Figure 13:
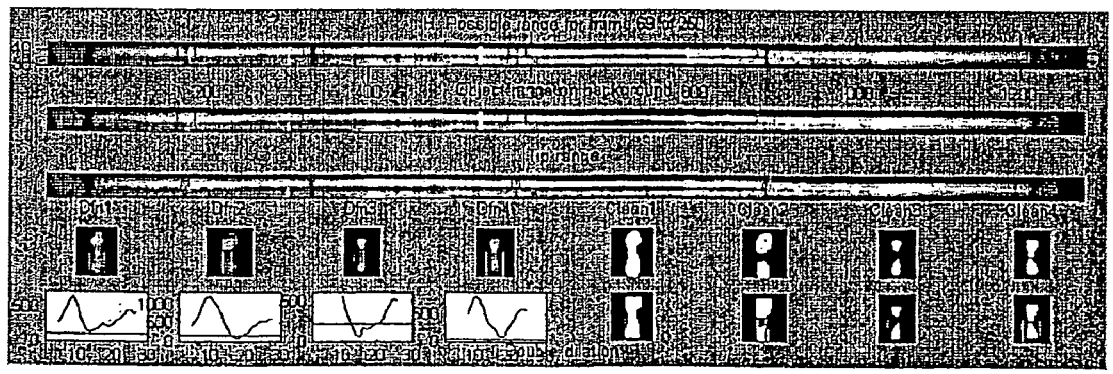

It is possible that pointers may satisfy both conditions as illustrated in FIG. 13. As can be seen the pointer is hovering above the touch surface and both of the above conditions are satisfied. Alternately contact states may be determined by examining the true pointer only.

Figure 14:
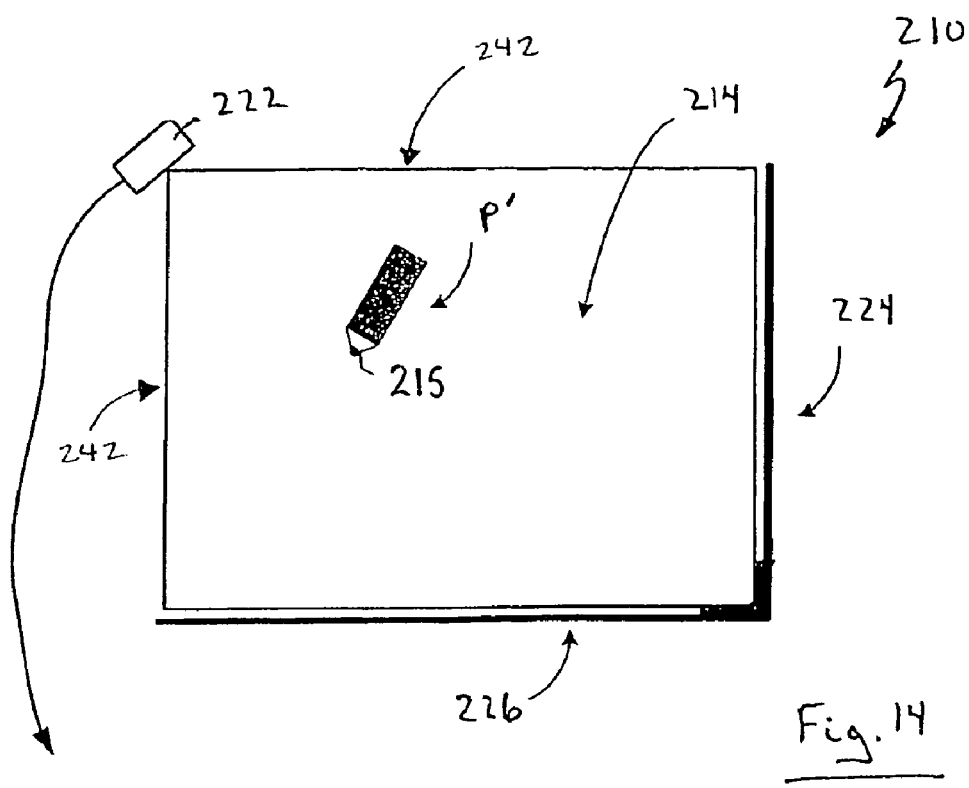
FIGS. 14 and 15 are schematic views of alternative embodiments of an apparatus for determining the location of a pointer within a region of interest in accordance with the present invention.
Figure 15:
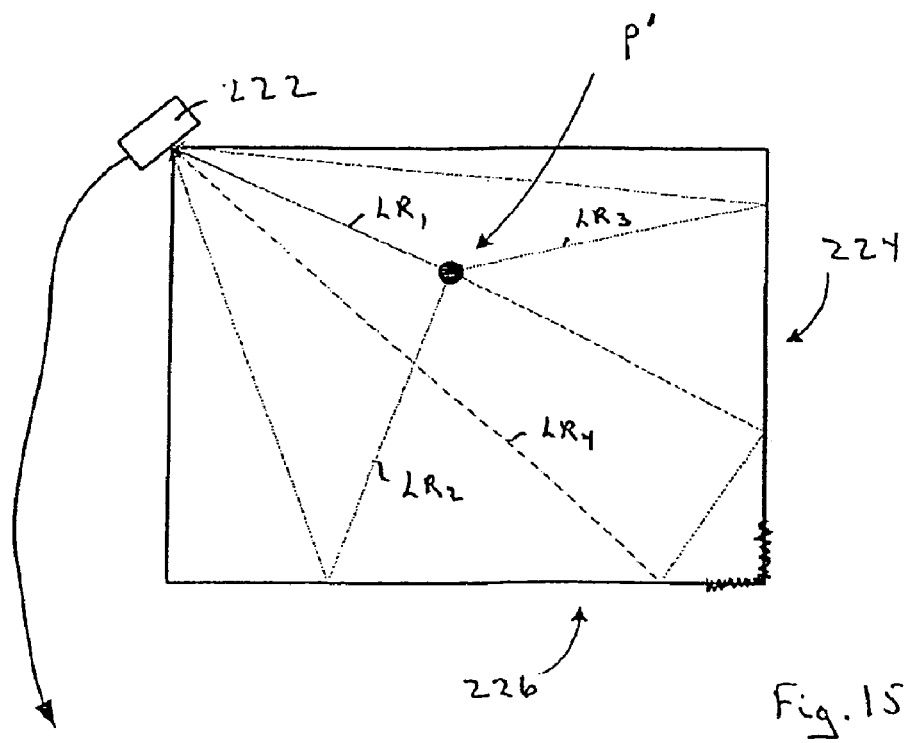

Turning now to FIGS. 14 and 15, an alternative embodiment of an apparatus in accordance with the present invention is shown and is generally identified by reference numeral 210. In this embodiment, the illuminated bezels are replaced with non-reflective material 242 and an active pointer P' is used to contact the touch surface 214. The active pointer includes a tip switch (not shown) and a light source 215 adjacent the tip of the active pointer. The light source 215 is preferably an infrared light emitting diode (IR LED). When the tip of the active pointer P' is brought into contact with the touch surface 214, the tip switch is activated and the IR LED is illuminated.

When the pointer P' is in contact with the touch surface 214 and the pointer emits infrared light, light rays are emitted by the IR LED as shown in FIG. 15. In this case, light ray LR$_1$ travels directly to the imaging device 222. Light rays LR$_2$ and LR$_3$ reflect off of one of the mirrors before travelling to the imaging device 222. Light ray LR$_4$ reflects off of both mirrors before travelling to the imaging device 222. As a result, the imaging device 222 sees either three or four pointer images allowing the position of the pointer P' relative to the touch surface 214 to be determined in the manner described previously. If desired, the active pointer P' may include two LEDs of different frequencies. In this case, one of the LEDs is illuminated when the pointer P' is out of contact with the touch surface 214 and is used to indicate hover. When the pointer P' is brought into contact with the touch surface 214, the tip switch activates the other LED and deactivates the hover LED. As a result, light of one frequency received by the imaging device 222 represents a hover condition while light of a different frequency received by the imaging device 222 represents a contact condition. Illuminated bezels 42 may be provided along the sides of the touch surface 214 with the illuminated bezels being turned off when an active pointer P' is being used and turned on when a passive pointer is being used. This of course yields an apparatus with dual passive/active pointer functionality.

Figure 16:
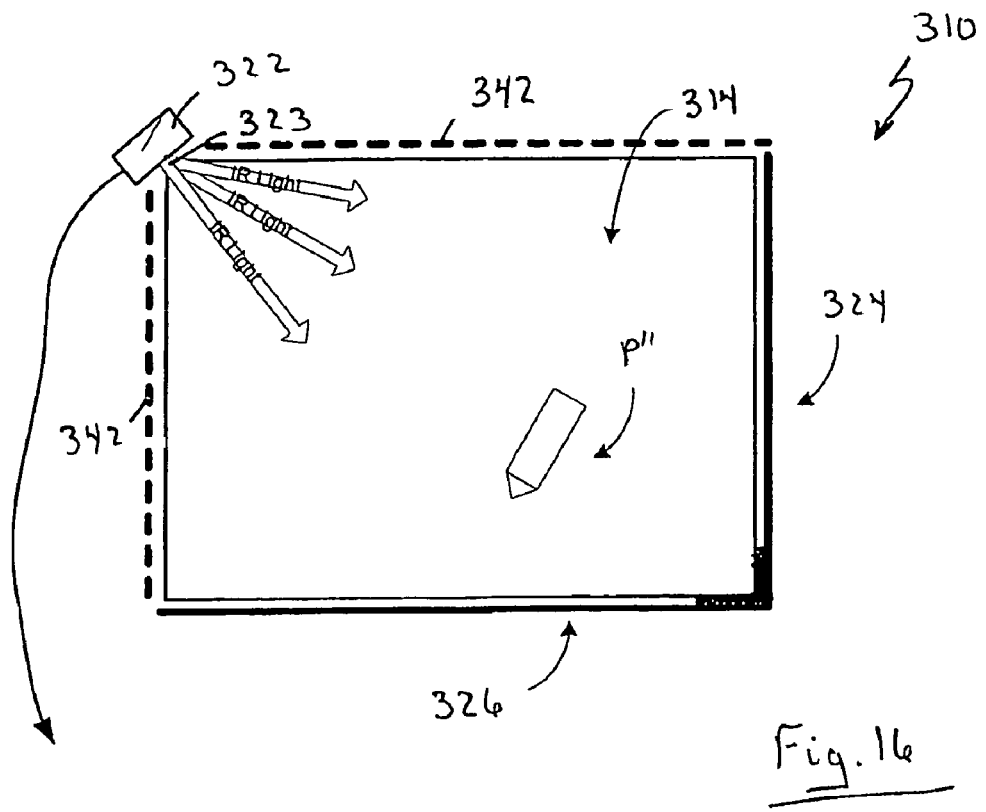
FIGS. 16 and 17 are schematic views of further alternative embodiments of an apparatus for determining the location of a pointer within a region of interest in accordance with the present invention.
Figure 17:
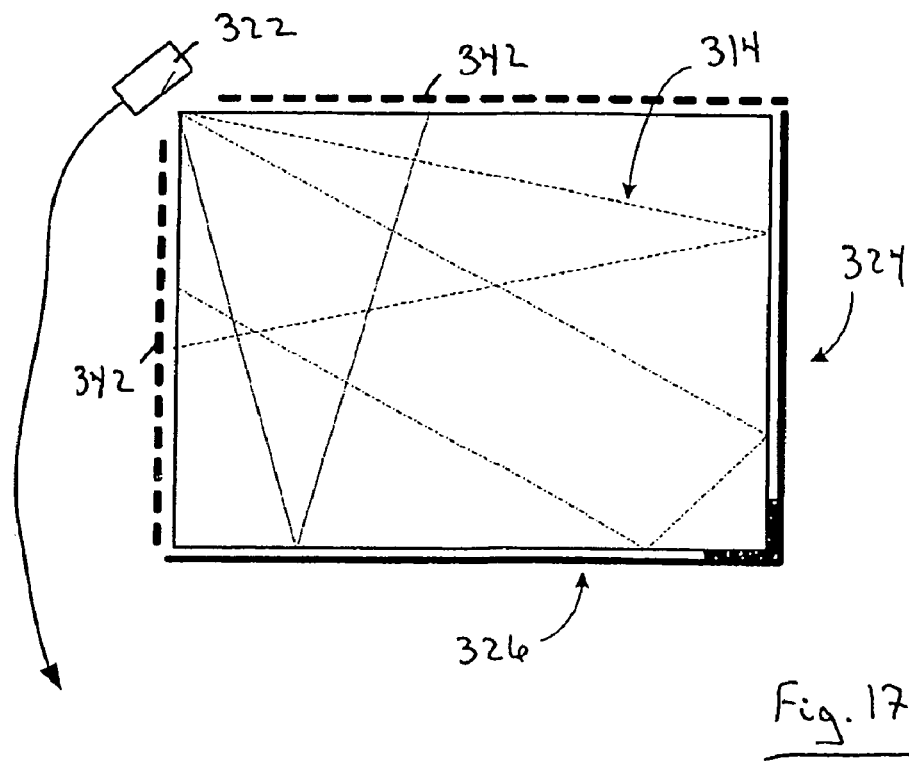

Turning now to FIGS. 16 and 17, yet another embodiment of an apparatus suitable for use with a passive pointer in accordance with the present invention is shown and is generally identified by reference numeral 310. In this embodiment, the illuminated bezels are replaced with retro-reflectors 342. Infrared LEDs 323 are positioned adjacent the imaging device 322 and direct infrared light into the region of interest. Light emitted by the infrared LEDs 323 travels across the touch surface 314, reflects off of one or both mirrors and strikes a retro-reflector 342. The retro-reflector 342 in turn reflects the light back in the direction from which it came and thus, the reflected light is returned to the imaging device 322. As a result, when no pointer is within the field of view of the imaging device, the imaging device 322 sees a brightly-lit band. However, when a pointer P'" is brought into the region of interest, the pointer occludes light and thus, the pointer and its reflections appear in captured images as dark areas. As a result, the imaging device 322 sees either three or four pointer images allowing the position of the pointer relative to the touch surface 314 to be determined in the manner described previously. Rather than using retroreflectors 342, high contrast material such as a black matte paint or felt can be provided along the sides of the touch surface.

Figure 18:
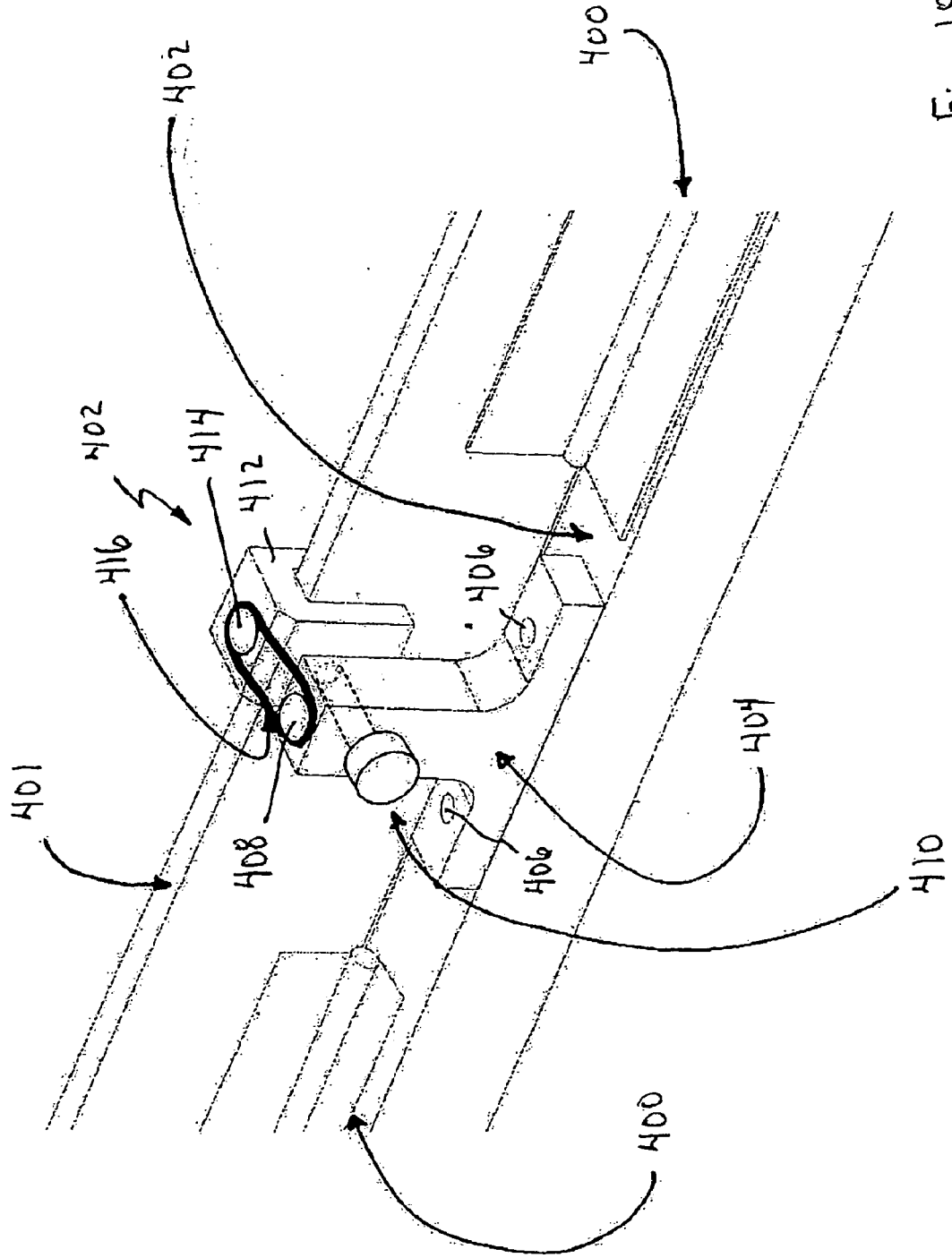
FIGS. 18 to 20 are alternative mirror assemblies.

Although the apparatuses have been described as including generally planar mirrors that are affixed to brackets by adhesive to maintain their desired orientations, other designs to reflect backlight illumination towards the active pixel sub-array of the imaging device are of course possible. For example, if desired, each mirror 401 may be connected to one side of the frame 402 via a pair of piano-type hinges 400 as shown in FIG. 18. A mirror adjustment mechanism 402 acts between the frame and the mirror and is generally centrally mounted on the side of the frame between the hinges 400. The mirror adjustment mechanism includes a mounting fixture 404 secured to the frame by suitable fasteners 406 such as, for example, blind rivets. A retaining post 408 extends upwardly from the top of the mounting fixture 404. A fine pitch screw 410 engages a threaded hole provided through the mounting fixture 404 and can be rotated to alter the distance by which the distal end of the screw 410 extends beyond the mounting fixture 404 towards the mirror. A bracket 412 engages the top of the mirror at a location in line with the screw 410. A second retaining post 414 extends upwardly from the top of the bracket 412. A biasing element 416 in the form of a loop of elastic cord engages the retaining posts 408 and 414 to bias the mirror so that the bracket remains in contact with the screw 410. Alternatively, the biasing element may take the form of a spring or other resilient element that urges the mirror toward the mounting fixture 404. During mirror alignment, the screw 410 is rotated in the appropriate direction either to tilt the mirror towards or away from the imaging device until the backlighting reflected by the mirror is directed towards the active pixel sub-array. The biasing element 416 acting between the bracket 412 and the mounting fixture 404 inhibits the mirror from moving once the mirror is in the desired orientation.

In a further embodiment, rather than using planar mirrors, curved mirrors can be used. In this case, the reflective surfaces of the mirrors are generally convex so that the bands of backlight illumination provided by the illuminated bezels when reflected by the mirrors are directed towards the active pixel sub-array of the imaging device. Curving the mirrors increases the fields of view of the mirrors and hence, reduces mounting tolerances. In this embodiment, the mirrors have a radius of curvature equal to approximately 100 inches. The radius of curvature of the mirrors and the height of the infrared illuminated bezels are selected so that at least ½ inch of the pointer tip is illuminated by reflected infrared backlighting when the pointer is in the region of interest and in contact with the touch surface.

Figure 19:
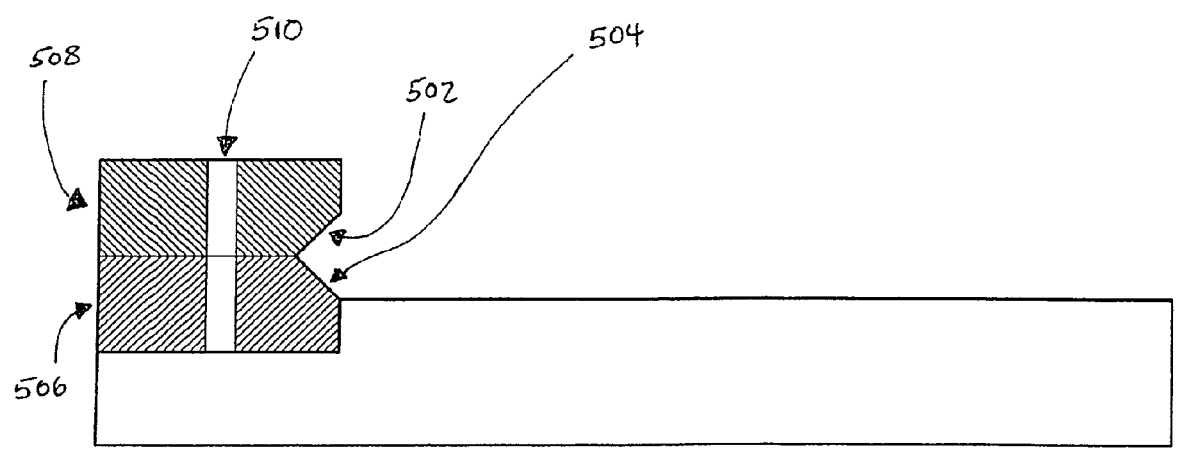

In yet another embodiment, the mirrors may include a pair of reflective surfaces 502 and 504 arranged 90 degrees with respect to one another to form a V-configuration as shown in FIG. 19. As can be seen, each mirror is formed from a pair of stacked trapezoidal metal pieces 506 and 508, in this case aluminum, each having a polished highly reflective surface. The metal pieces carry mating formations such as locating pins 510 and complimentary holes to position accurately the metal pieces relative to one another and to locate the mirrors on the frame.

Figure 20:
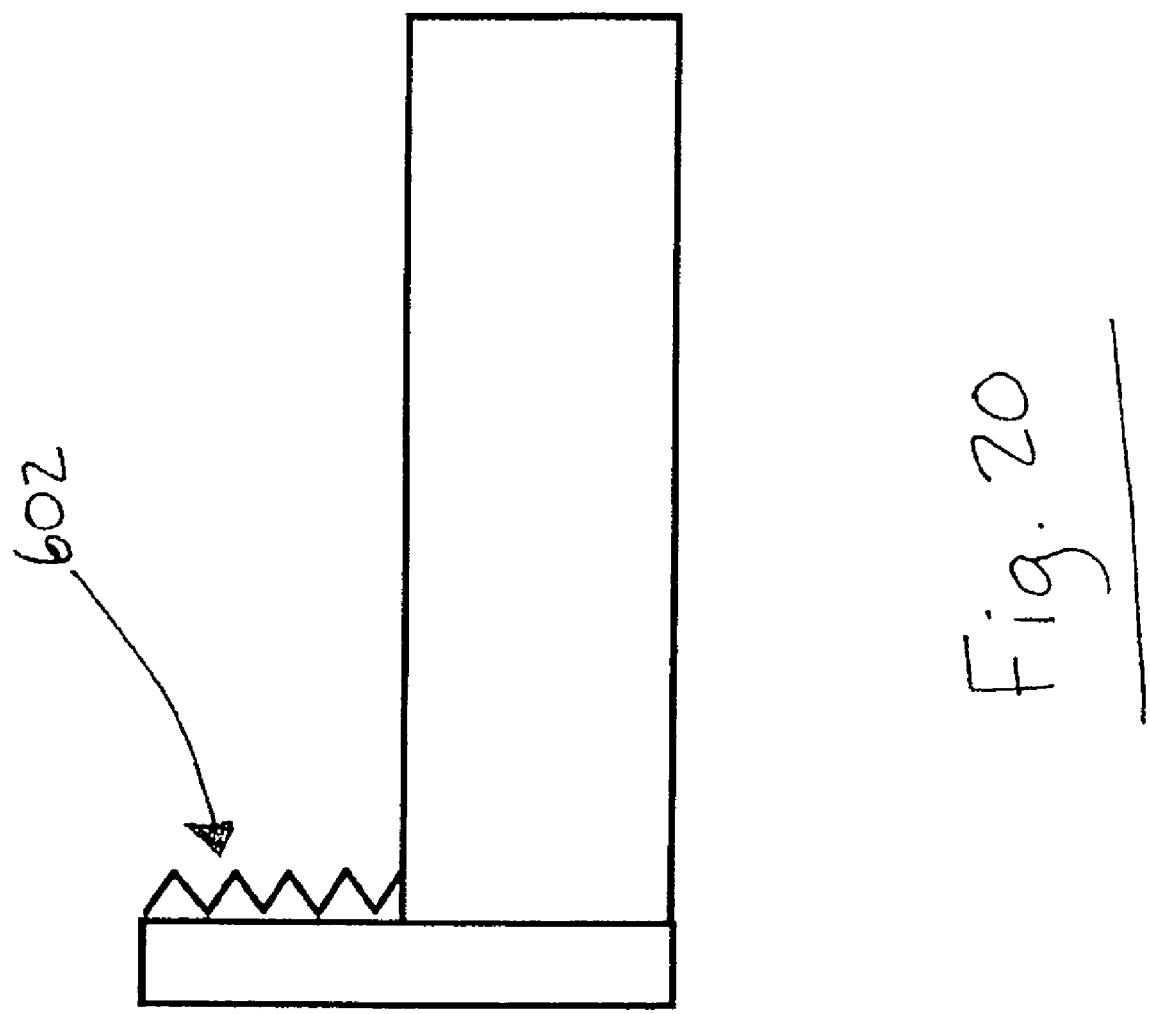

In still yet another embodiment, the mirrors may include corrugated reflective surfaces 602 defined by stacked pairs of reflective surfaces arranged 90 degrees with respect to one another as shown schematically in FIG. 20. In this case, each mirror is formed of a block of acrylic material having one surface that is compression molded to define a corrugated surface including a series of stacked V-grooves such as that manufactured by Fresnel Optics under model number PR713. A reflective coating is applied to the corrugated surface by sputtering or other suitable technique. The mirror is positioned on the frame with the corrugated reflective surface nearest the imaging device. Alternatively, the mirror may be positioned on the frame with the corrugated reflective surface furthest from the imaging device. In this case, the backlight illumination enters and travels through the block of material before being reflected back by the corrugated reflective surface.

Although the gap has been shown and described as extending along two sides of the region of interest, those of skill in the art will appreciate that the non-reflective region associated with the gap need only extend along one side of the region of interest to inhibit the double pointer reflection from occurring when the pointer is adjacent the corner 32. Also, although the non-reflective region is shown as a gap between the mirrors 24 and 26, if the mirrors join at the corner 32, the mirrors can be rendered non-reflective at the corner 32 using a suitable coating or covering to define the non-reflective region.

Figure 21:
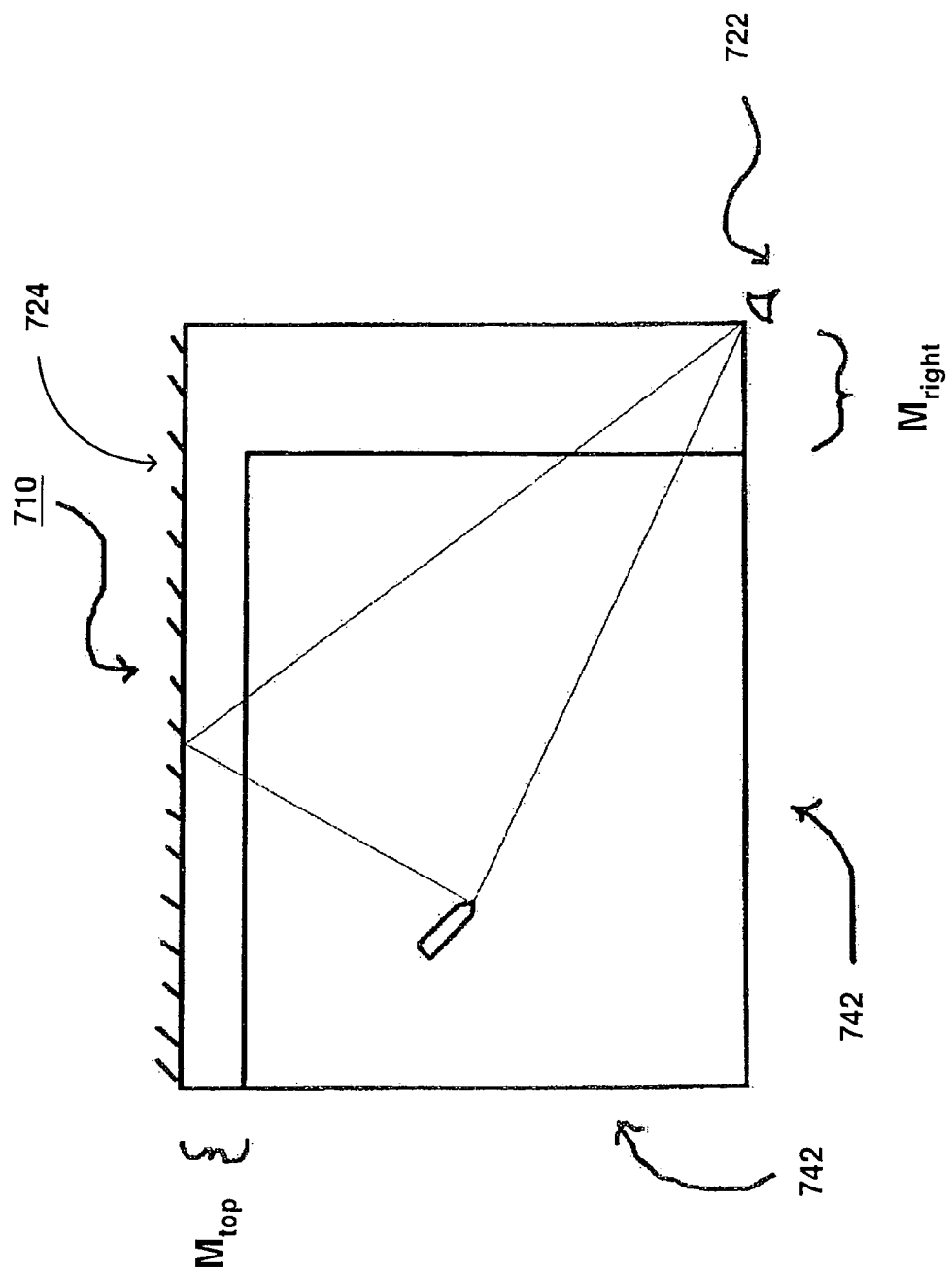
FIG. 21 is a schematic view of yet a further alternative embodiment of an apparatus for determining the location of a pointer within a region of interest in accordance with the present invention.

Turning now to FIG. 21, yet another embodiment of an apparatus in accordance with the present invention is shown and is identified by reference numeral 710. In this embodiment, only a single mirror 724 is provided along one side of the region of interest. The remaining sides are coated with a high contrast material 742, in this case a black matte paint or felt. Similar to the embodiment of FIGS. 16 and 17, infrared LEDs (not shown) are positioned adjacent the imaging device 722 and direct infrared light into the region of interest. Since only one mirror is utilized in this embodiment, fewer images of the pointer appear in captured images although sufficient pointer images appear in order to triangulate the position of the pointer. Also, since only one mirror is utilized, an L-shaped margin extending along two sides of the active area 734 is required to inhibit pointer image merging.

Figure 22A:
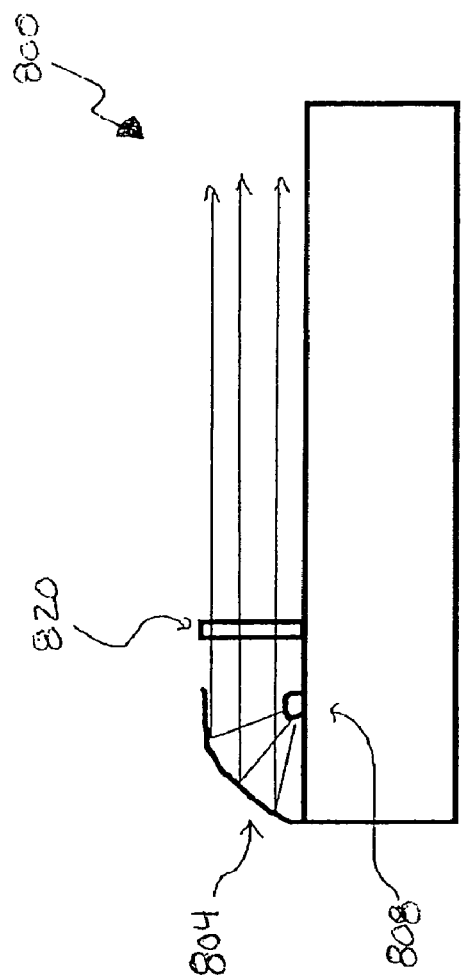
FIG. 22a is a side view of an alternative embodiment of an illuminated bezel.
Figure 22B:
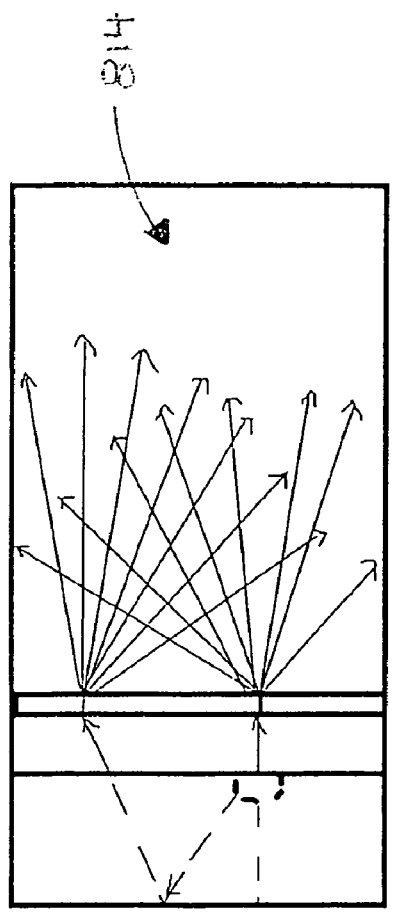

FIGS. 22*a* and 22*b* show an alternative design for the illuminated bezels generally at 800. As can be seen, in this embodiment the illuminated bezel 800 includes a parabolic collimator 804 formed on an internal bezel surface that reflects light from an LED 808 back across the touch surface 814 on paths parallel to the touch surface 814. A lenticular array 820 positioned between the touch surface 814 and the collimator 804 and LED 808 disperses the light reflected by the collimator 804 across the touch surface 814. The lenticular array 820 can, for example, have a number of facets that redirect light within a horizontal plane above the touch surface 814, while preserving its vertical component to ensure that the light travels across the touch surface 814 and not away from or towards it. By redirecting a significant portion of the light from the LED 808 across the touch surface 814, a greater intensity of light is viewed by the imaging device, thus providing better resolution in the images captured. As seen in FIG. 22*b*, by positioning the LED 808 a significant distance from the collimator 804, light is dispersed over a broad area by the lenticular array 820. In this manner, the touch surface is illuminated relatively evenly using a limited number of light sources. The collimator and lenticular array may be combined into a dual-sided thin film placed in between the LED and the region of interest.

The digital camera is described as being mounted on a circuit board and positioned so that its field of view looks across the plane of the touch surface. As will be appreciated, the circuit board can of course be located at different locations. In this case, folding optics are used to aim the field of view across the plane of the touch surface. As will also be appreciated a variety of different types of imaging devices can be used to capture images such as for example CCD sensors and line arrays.

Although preferred embodiments of the present invention have been described, those of skill in the art will appreciate that variations and modifications may be made without departing from the spirit and scope thereof as defined by the appended claims.

What is claimed is:

1. An apparatus for detecting a pointer within a region of interest comprising:
   a first reflective element extending along a first side of said region of interest and reflecting light towards said region of interest;
   a second reflective element extending along a second side of said region of interest and reflecting light towards said region of interest, said second side being joined to said first side to define a first corner;
   a non-reflective region generally in the plane of at least one of said first and second reflective elements adjacent said first corner; and
   at least one imaging device capturing images of said region of interest including reflections from said first and second reflective elements, wherein said non-reflective region is sized to eliminate overlapping images of the pointer appearing in the captured images.

2. An apparatus according to claim 1 wherein said non-reflective region extends in the planes of both of said first and second reflective elements.

3. An apparatus according to claim 2 wherein said first reflective element extends only partially along said first side and wherein said second reflective element extends only partially along said second side thereby to define a gap in said first and second reflective elements at said first corner.

4. An apparatus according to claim 2 wherein said first reflective element extends generally along the length of said first side and wherein said second reflective element extends generally along the length of said second side, said first and second reflective elements being rendered non-reflective at said first corner thereby to define said non-reflective region.

5. An apparatus according to claim 1 wherein said non-reflective region extends only in the plane of one of said first and second reflective elements.

6. An apparatus according to claim 5 wherein said one reflective element extends only partially along the respective side of said region of interest thereby to define a gap in said one reflective element at said first corner.

7. An apparatus according to claim 5 wherein said one reflective element extends generally along the length of the respective side of said region of interest, said one reflective element being rendered non-reflective at said first corner thereby to define said non-reflective region.

8. An apparatus according to claim 1 wherein said non-reflective region is of a size to inhibit merging of a pointer with a double reflection of said pointer in a captured image.

9. An apparatus according to claim 8 wherein said size is a function of said region of interest and the thickness of said pointer.

10. An apparatus according to claim 9 wherein said first and second reflective elements extend along first and second sides of a generally rectangular touch surface.

11. An apparatus according to claim 10 wherein said region of interest includes an active area delineated by a margin extending about the periphery of said touch surface.

12. An apparatus according to claim 11 wherein said margin is of a size to inhibit merging of a pointer with one or more reflections of said pointer in a captured image.

13. An apparatus according to claim 12 wherein said non-reflective region extends in the planes of both of said first and second reflective elements.

14. An apparatus according to claim 13 wherein said first reflective element extends only partially along said first side and wherein said second reflective element extends only partially along said second side thereby to define a gap in said first and second reflective elements at said first corner.

15. An apparatus according to claim 13 wherein said first reflective element extends generally along the length of said first side and wherein said second reflective element extends generally along the length of said second side, said first and second reflective elements being rendered non-reflective at said first corner thereby to define said non-reflective region.

16. An apparatus according to claim 12 wherein said non-reflective region extends only in the plane of one of said first and second reflective elements.

17. An apparatus according to claim 16 wherein said one reflective element extends only partially along the respective side of said region of interest thereby to define a gap in said one reflective element at said first corner.

18. An apparatus according to claim 16 wherein said one reflective element extends generally along the length of the respective side of said region of interest, said one reflective element being rendered non-reflective at said first corner thereby to define said non-reflective region.

19. An apparatus according to claim 1 wherein at least one of said first and second reflective elements includes a plurality of reflective surfaces, said plurality of reflective surfaces including at least one pair of reflective surfaces arranged generally at right angles to one another and taking a V-configuration.

20. An apparatus according to claim 19 wherein said at least one first and second reflective element includes multiple pairs of reflective surfaces arranged generally at right angles to one another with each pair taking a V-configuration thereby to define a corrugated reflective surface.

21. An apparatus according to claim 20 wherein said at least one first and second reflective element is formed of material having a corrugated surface with a reflective coating thereon thereby to form said corrugated reflective surface.

22. An apparatus according to claim 21 wherein said material has a thickness defining opposed outer major surfaces, one of said major surfaces defining said corrugated surface and another of said major surfaces being generally planar.

23. An apparatus according to claim 22 wherein said at least one first and second element is arranged so that said corrugated reflective surface is nearest said region of interest.

24. An apparatus according to claim 22 wherein said material is light transmissive and wherein said at least one first and second reflective element is arranged so that said planar major surface is nearest said region of interest.

25. An apparatus according to claim 21 wherein both of said first and second reflective elements have corrugated reflective surfaces.

26. An apparatus according to claim 25 wherein said first and second reflective elements are formed of material having a corrugated surface with a reflective coating thereon thereby to form said corrugated reflective surfaces.

27. An apparatus according to claim 26 wherein said material has a thickness defining opposed outer major surfaces, one of said major surfaces defining said corrugated surface and another of said major surfaces being generally planar.

28. An apparatus according to claim 27 wherein said first and second reflective elements are arranged so that said corrugated reflective surfaces are nearest said region of interest.

29. An apparatus according to claim 27 wherein said material is light transmissive and wherein said first and second reflective elements are arranged so that said planar major surfaces are nearest said region of interest.

30. An apparatus according to claim 19 wherein said at least one of said first and second reflective elements includes a single pair of reflective surfaces.

31. An apparatus according to claim 30 wherein said at least one reflective element includes a pair of stacked trapezoidal pieces, each having a reflective surface.

32. An apparatus according to claim 30 wherein said trapezoidal pieces are formed from metal having a polished surface defining said reflective surface.

33. An apparatus according to claim 19 wherein each of said first and second reflective elements includes a single pair of reflective surfaces.

34. An apparatus according to claim 33 wherein each of said first and second reflective elements includes a pair of stacked trapezoidal pieces, each having a reflective surface.

35. An apparatus according to claim 34 wherein said trapezoidal pieces are formed from metal having a polished surface defining said reflective surface.

36. An apparatus according to claim 1 wherein at least one of said first and second reflective elements includes a generally planar reflective surface.

37. An apparatus according to claim 36 wherein said generally planar reflective surface is adjustable relative to the plane of said region of interest to position said reflective surface so that light reflected thereby is directed towards said at least one imaging device.

38. An apparatus according to claim 1 wherein both of said first and second reflective elements includes a generally planar reflective surface.

39. An apparatus according to claim 38 wherein each of said planar reflective surfaces is adjustable relative to the plane of said region of interest to position said reflective surfaces so that light reflected thereby is directed towards said at least one imaging device.

40. An apparatus according to claim 39 wherein said first and second reflective surfaces are flat.

41. An apparatus according to claim 38 wherein said first and second reflective surfaces are slightly convex.

42. An apparatus according to claim 41 wherein said each of said first and second reflective surfaces has a radius of curvature generally equal to about 100 inches.

43. An apparatus according to claim 1 including a single imaging device.

44. An apparatus according to claim 43 wherein said imaging device looks across said region of interest from a second corner thereof diagonally opposite said first corner.

45. An apparatus according to claim 43 wherein said imaging device includes an image sensor having an active pixel sub-array, light reflected by said first and second reflective elements being directed towards said active pixel sub-array.

46. An apparatus for detecting a pointer within a region of interest comprising:
a generally rectangular touch surface having an active sub-area defining said region of interest;
a first reflective element extending along a first side of said touch surface and reflecting light towards said region of interest;
a second reflective element extending along a second side of said touch surface and reflecting light towards said region of interest, said second side being joined to said first side at a first corner of said touch surface;
a non-reflective region generally in the plane of at least one of said first and second reflective elements adjacent said first corner; and
a detecting device detecting a pointer within said region of interest and reflections of said pointer appearing in said first and second reflective elements and determining the location of said pointer within said region of interest, said active sub-area being sized to inhibit said detecting device from detecting a pointer within said region of interest that merges with one or more of said reflections to an extent that said pointer and one or more reflections cannot be resolved, said non-reflective region being sized to inhibit the detecting device from detecting overlapping images of the pointer.

47. An apparatus according to claim 46 wherein said active sub-area is delineated by a rectangular margin about the periphery of said touch surface.

48. An apparatus according to claim 47 wherein said non-reflective region is sized to inhibit said detecting device from detecting merging of the pointer with a double reflection of said pointer appearing in one of said first and second reflective elements.

49. An apparatus according to claim 48 wherein said detecting device looks across said touch surface from a second corner thereof diagonally opposite said first corner.

50. An apparatus according to claim 49 wherein said detecting device includes an image sensor having an active pixel sub-array, light reflected by said first and second reflective elements being directed towards said active pixel sub-array.

51. An apparatus according to claim 50 wherein said non-reflective region is constituted by a gap in at least one of said first and second reflective elements adjacent said first corner.

52. An apparatus according to claim 50 wherein said non-reflective region is constituted by a portion of at least one of said first and second reflective elements rendered non-reflective adjacent said first corner to define said non-reflective region.

53. An apparatus according to claim 50 wherein said first and second reflective elements are configured to aim reflected light towards said active pixel sub-array.

54. An apparatus according to claim 53 wherein said first and second reflective elements are angled relative to said touch surface to aim reflected light towards said pixel sub-array.

55. An apparatus according to claim 53 wherein said first and second reflective elements having multiple reflective surfaces arranged relative to one another to aim reflected light towards said pixel sub-array.

56. An apparatus according to claim 49 further comprising:
at least one illumination source adjacent said detecting device and directing light across said region of interest; and
retro-reflective surfaces extending along the other two sides of said touch surface, said retro-reflective surfaces reflecting incident light impinging thereon back towards the region of interest.

57. An apparatus according to claim 56 wherein said detecting device includes an image sensor having an active pixel sub-array, light reflected by said first and second reflective elements being directed towards said active pixel sub-array.

58. An apparatus according to claim 57 wherein said first and second reflective elements are configured to aim reflected light towards said active pixel sub-array.

59. An apparatus according to claim 58 wherein said first and second reflective elements are angled relative to said touch surface to aim reflected light towards said pixel sub-array.

60. An apparatus according to claim 58 wherein said first and second reflective elements having multiple reflective surfaces arranged relative to one another to aim reflected light towards said pixel sub-array.

61. An apparatus according to claim 48 further comprising illumination sources extending along the other two sides of said touch surface, said illumination sources directing light towards said first and second reflective elements.

62. An apparatus according to claim 61 further comprising a gap illumination source extending along said non-reflective region.

63. An apparatus according to claim 62 wherein said illumination sources and said gap illumination source are infrared illumination sources.

64. An apparatus according to claim 62 wherein said detecting device includes an image sensor having an active pixel sub-array, light reflected by said first and second reflective elements being directed towards said active pixel sub-array.

65. An apparatus according to claim 64 wherein said first and second reflective elements are configured to aim reflected light towards said active pixel sub-array.

66. An apparatus according to claim 65 wherein said first and second reflective elements are angled relative to said touch surface to aim reflected light towards said pixel sub-array.

67. An apparatus according to claim 65 wherein said first and second reflective elements having multiple reflective surfaces arranged relative to one another to aim reflected light towards said pixel sub-array.

68. An apparatus according to claim 61 further including an illumination source at said non-reflective region and directing light towards said detecting device.

69. An apparatus according to claim 48 wherein said pointer emits light at least when in contact with said touch surface and where the other two sides of said touch surface are non-reflective.

70. An apparatus according to claim 69 wherein said detecting device includes an image sensor having an active pixel sub-array, light reflected by said first and second reflective elements being directed towards said active pixel sub-array.

71. An apparatus according to claim 70 wherein said first and second reflective elements are configured to aim reflected light towards said active pixel sub-array.

72. An apparatus according to claim 71 wherein said first and second reflective elements are angled relative to said touch surface to aim reflected light towards said pixel sub-array.

73. An apparatus according to claim 71 wherein said first and second reflective elements having multiple reflective surfaces arranged relative to one another to aim reflected light towards said pixel sub-array.

74. An apparatus for detecting a pointer within a region of interest comprising:
a first reflective element extending along a first side of said region of interest and reflecting light towards said region of interest;
a second reflective element extending along a second side of said region of interest and reflecting light towards said region of interest, said second side being joined to said first side to define a first corner;
a non-reflective region generally in the plane of at least one of said first and second reflective elements adjacent said first corner; and
at least one imaging device capturing images of said region of interest and reflections from said first and second reflective elements, said at least one imaging device having an active pixel sub-array and said first and second reflective elements being configured to aim reflected light towards said active pixel sub-array, wherein said non-reflective region is of a size to inhibit merging of a pointer with a double reflection of said pointer in a captured image.

75. An apparatus according to claim 74 wherein said first and second reflective elements are angled relative to said region of interest to aim reflected light towards said pixel sub-array.

76. An apparatus according to claim 74 wherein said first and second reflective elements having multiple reflective surfaces arranged relative to one another to aim reflected light towards said pixel sub-array.

77. An apparatus according to claim 76 wherein said multiple reflective surfaces include at least one pair of reflective surfaces arranged generally at right angles to one another and taking a V-configuration.

78. An apparatus according to claim 76 wherein said multiple reflective surfaces include multiple pairs of reflective surfaces arranged generally at right angles to one another with each pair taking a V-configuration thereby to define a corrugated reflective surface.

79. An apparatus for detecting a pointer within a region of interest comprising:
a first reflective element extending along a first side of said region of interest and reflecting light towards said region of interest;
a second reflective element extending along a second side of said region of interest and reflecting light towards said region of interest, said second side being joined to said first side to define a first corner;
a non-reflective region generally in the plane of at least one of said first and second reflective elements adjacent said first corner; and
at least one imaging device capturing images of said region of interest including reflections from said first and second reflective elements, wherein said non-reflective region is of a size to inhibit merging of a pointer with a double reflection of said pointer in a captured image.

80. An apparatus according to claim 79 wherein said size is a function of said region of interest and the thickness of said pointer.

81. An apparatus according to claim 80 wherein said first and second reflective elements extend along first and second sides of a generally rectangular touch surface.

82. An apparatus according to claim 81 wherein said region of interest includes an active area delineated by a margin extending about the periphery of said touch surface.

83. An apparatus according to claim 82 wherein said margin is of a size to inhibit merging of a pointer with one or more reflections of said pointer in a captured image.

84. An apparatus according to claim 83 wherein said non-reflective region extends in the planes of both of said first and second reflective elements.

85. An apparatus according to claim 84 wherein said first reflective element extends only partially along said first side and wherein said second reflective element extends only partially along said second side thereby to define a gap in said first and second reflective elements at said first corner.

86. An apparatus according to claim 84 wherein said first reflective element extends generally along the length of said first side and wherein said second reflective element extends generally along the length of said second side, said first and second reflective elements being rendered non-reflective at said first corner thereby to define said non-reflective region.

87. An apparatus according to claim 83 wherein said non-reflective region extends only in the plane of one of said first and second reflective elements.

88. An apparatus according to claim 87 wherein said one reflective element extends only partially along the respective side of said region of interest thereby to define a gap in said one reflective element at said first corner.

89. An apparatus according to claim 87 wherein said one reflective element extends generally along the length of the respective side of said region of interest, said one reflective element being rendered non-reflective at said first corner thereby to define said non-reflective region.

* * * * *